US012760826B2

(12) United States Patent
Hess et al.

(10) Patent No.: US 12,760,826 B2
(45) Date of Patent: Oct. 13, 2026

(54) SYSTEMS AND METHODS FOR LATCHING AND FASTENING OBJECTS FOR IN-SPACE SERVICING, ASSEMBLY, AND MANUFACTURING

(71) Applicant: Enduralock, LLC, Lenexa, KS (US)

(72) Inventors: Harold Hess, Leawood, KS (US); Deeptesh Selvaraj, Pitt Meadows (CA); Kishan Srinivas Indrani, Lenexa, KS (US); Zoltan Szekely, Cypress, TX (US); Caleb Grabill, Olathe, KS (US); Jonathan Poulter, Denver, CO (US)

(73) Assignee: Enduralock, LLC, Lenexa, KS (US)

( * ) Notice: Subject to any disclaimer, the term of this patent is extended or adjusted under 35 U.S.C. 154(b) by 305 days.

(21) Appl. No.: 18/409,280

(22) Filed: Jan. 10, 2024

(65) Prior Publication Data

US 2024/0230002 A1 Jul. 11, 2024

Related U.S. Application Data

(60) Provisional application No. 63/438,379, filed on Jan. 11, 2023.

(51) Int. Cl.

| | |
|---|---|
| ***F16L 37/35*** | (2006.01) |
| ***B64G 1/40*** | (2006.01) |
| ***B64G 1/64*** | (2006.01) |
| ***H01R 13/533*** | (2006.01) |
| ***H01R 13/631*** | (2006.01) |
| ***H01R 13/635*** | (2006.01) |
| ***H01R 13/66*** | (2006.01) |
| ***H01R 13/71*** | (2006.01) |

(52) U.S. Cl.

CPC ............ *F16L 37/35* (2013.01); *B64G 1/4024* (2023.08); *B64G 1/646* (2013.01); *H01R 13/533* (2013.01); *H01R 13/631* (2013.01); *H01R 13/635* (2013.01); *H01R 13/6683* (2013.01); *H01R 13/71* (2013.01)

(58) Field of Classification Search

CPC .... B64G 1/6462; B64G 1/646; B64G 1/4024; H01R 13/631

See application file for complete search history.

(56) References Cited

U.S. PATENT DOCUMENTS

| | | | | |
|---|---|---|---|---|
| 4,500,057 | A | | 2/1985 | Duwelz |
| 4,508,404 | A | | 4/1985 | Frawley |
| 4,964,596 | A | | 10/1990 | Granssle et al. |
| 4,976,399 | A | * | 12/1990 | Bay .......................... B64G 1/642 244/172.4 |
| 5,364,046 | A | * | 11/1994 | Dobbs .................. B64G 1/6464 244/172.4 |
| 5,364,064 | A | | 11/1994 | Dobbs et al. |

(Continued)

*Primary Examiner* — Joshua J Michener
*Assistant Examiner* — Cindi M Curry
(74) *Attorney, Agent, or Firm* — Armstrong Teasdale LLP

(57) ABSTRACT

A docking system for use with in-space structures includes a first connector attached to a first in-space structure and a second connector attached to a second in-space structure. The first connector includes a first housing that defines a recess. The second connector includes a second housing that is received within the recess of the first housing. The docking system also includes an engagement mechanism configured to secure the second housing in the recess.

20 Claims, 23 Drawing Sheets

(56) References Cited

U.S. PATENT DOCUMENTS

| | | | | |
|---|---|---|---|---|
| 5,429,328 | A * | 7/1995 | Dobbs | B64G 1/6464 244/172.5 |
| 6,896,441 | B1 | 5/2005 | Champagne et al. | |
| 7,293,743 | B2 | 11/2007 | Cepollina et al. | |
| 8,240,613 | B2 * | 8/2012 | Ritter | B64G 1/6462 244/172.4 |
| 9,231,323 | B1 * | 1/2016 | Jaeger | B64G 1/6464 |
| 11,530,053 | B2 | 12/2022 | Wingo et al. | |
| 11,572,200 | B2 * | 2/2023 | Gregory | B64G 1/6464 |
| 12,187,466 | B2 * | 1/2025 | Bultitude | B64G 1/6462 |
| 2008/0157018 | A1 * | 7/2008 | Kessell | B65D 51/28 251/315.01 |
| 2012/0000575 | A1 | 1/2012 | Yandle et al. | |
| 2023/0278729 | A1 | 9/2023 | Hess et al. | |
| 2025/0313352 | A1 * | 10/2025 | Hess | B64G 1/641 |

* cited by examiner

SYSTEMS AND METHODS FOR LATCHING AND FASTENING OBJECTS FOR IN-SPACE SERVICING, ASSEMBLY, AND MANUFACTURING

CROSS-REFERENCE TO RELATED APPLICATION

This application claims priority to U.S. Provisional Application Ser. No. 63/438,379, filed on Jan. 11, 2023, the contents of which are hereby incorporated by reference in their entirety.

STATEMENT REGARDING FEDERALLY SPONSORED RESEARCH OR DEVELOPMENT

This invention was made with government support under the Small Business Technology Transfer Program Contract No. FA945322CA059 awarded by the Department of the Air Force Office of Small Business. The government has certain rights in the invention.

BACKGROUND

The field of the disclosure relates generally to latching and fastening mechanisms, and more specifically to docking systems including latching and fastening mechanisms for in-space servicing, assembly, and manufacturing.

In-space structures such as satellites and space stations orbit around planets or other gravitational bodies and provide many services for humans. For example, satellites have become crucial for use in systems that are vital in humans daily lives such as telecommunication and global positioning systems. However, the in-space structures can be difficult and expensive to assemble and maintain. For example, some satellites must be assembled or repaired while the satellite is in orbit. The systems to assemble or repair the in-space structures require precise handling and positioning of the in-space structures and parts. However, the components may be difficult to control remotely or in space.

Therefore, there is a need for systems and methods for latching and fastening objects for in-space servicing assembly, and manufacturing.

BRIEF DESCRIPTION

In one aspect, a docking system for use with in-space structures includes a first connector attached to a first in-space structure and a second connector attached to a second in-space structure. The first connector includes a first housing, a sleeve, and an engagement mechanism. The second connector includes a second housing and a connection member. The second housing is received within the first housing. The sleeve defines a recess sized to receive the connection member. The engagement mechanism is configured to engage the connection member when the connection member is in the recess.

In another aspect, a method of connecting in-space structures includes moving a first in-space structure relative to a second in-space structure. The first in-space structure includes a first connector including a first housing, a sleeve, and an engagement mechanism. The second in-space structure includes a second connector including a second housing and a connection member. The method also includes positioning the connection member in a recess defined by the sleeve, engaging the connection member with the engagement mechanism within the recess, and positioning the second housing within a recess defined by the first housing.

In yet another aspect, a docking system for use with in-space structures includes a first connector attached to a first in-space structure and a second connector attached to a second in-space structure. The first connector includes a first housing defining a recess. The second connector includes a second housing that is received within the recess of the first housing. The docking system also includes an engagement mechanism configured to secure the second housing in the recess. The docking system further includes a fluid dispenser extending through one of the first connector or the second connector, and a fluid inlet extending through the other of the first connector or the second connector. The fluid inlet is configured to engage with the fluid dispenser and receive fluid dispensed from the fluid dispenser when the second housing is secured in the recess.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms such as "about," "approximately," and "substantially" are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Relative descriptors used herein such as upward, downward, left, right, up, down, length, height, width, thickness, and the like are with reference to the figures, and not meant in a limiting sense. Additionally, the illustrated embodiments can be understood as providing example features of varying detail of certain embodiments, and therefore, features, components, modules, elements, and/or aspects of the illustrations can be otherwise combined, interconnected, sequenced, separated, interchanged, positioned, and/or rearranged without materially departing from the disclosed docking systems. Additionally, the shapes and sizes of components are also examples and can be altered without materially affecting or limiting the disclosed technology.

Figure 1:
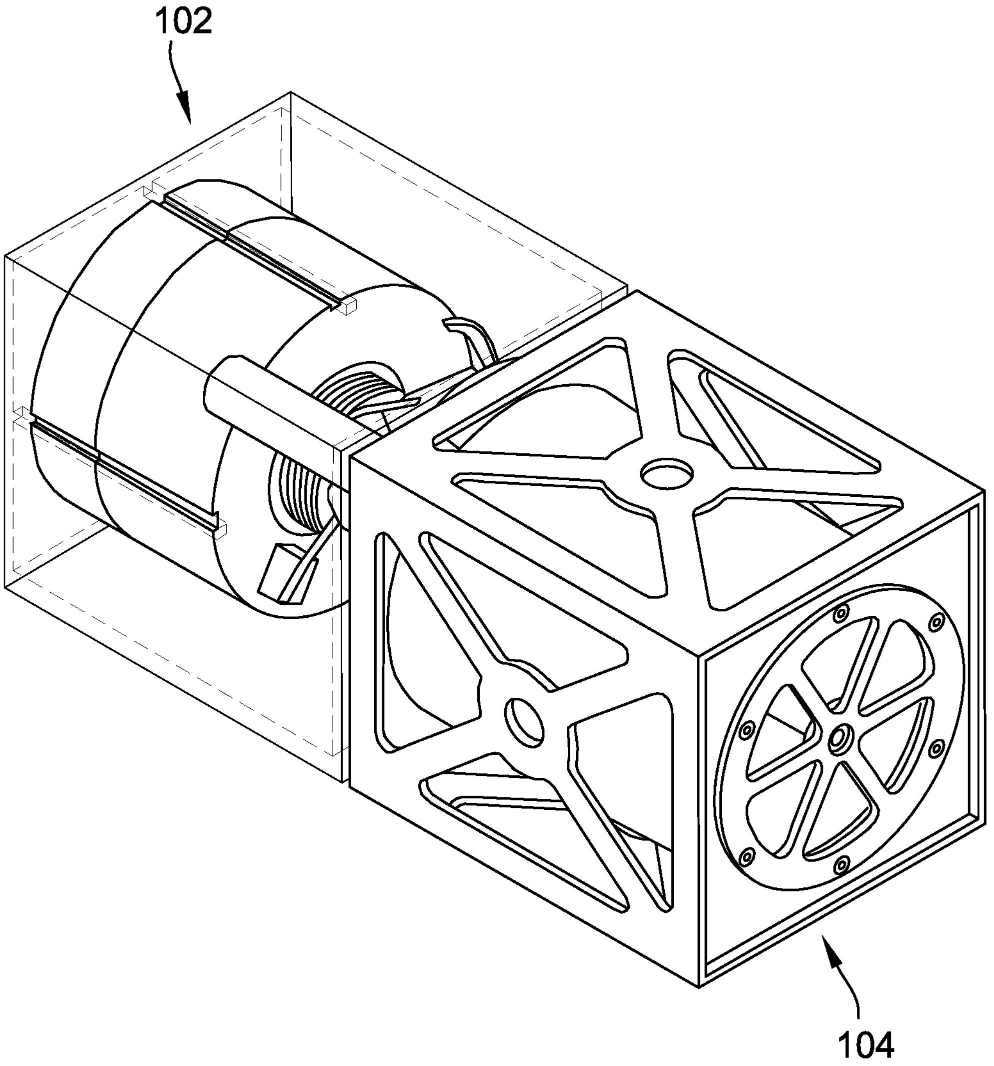
FIG. 1 is a perspective view of two structures secured together by a docking system.
Figure 2:
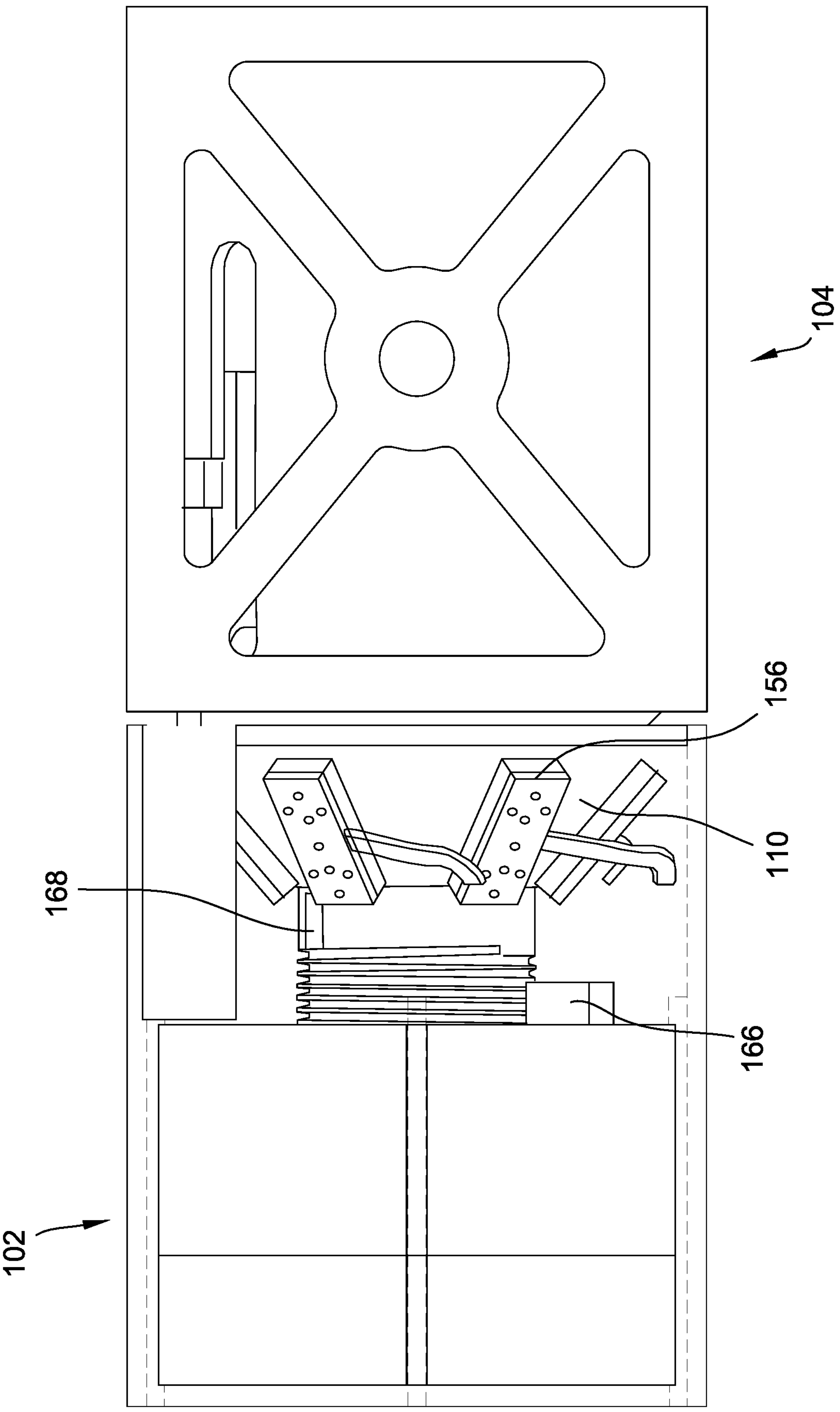
FIG. 2 is a front view of the two structures of FIG. 1.
Figure 3:
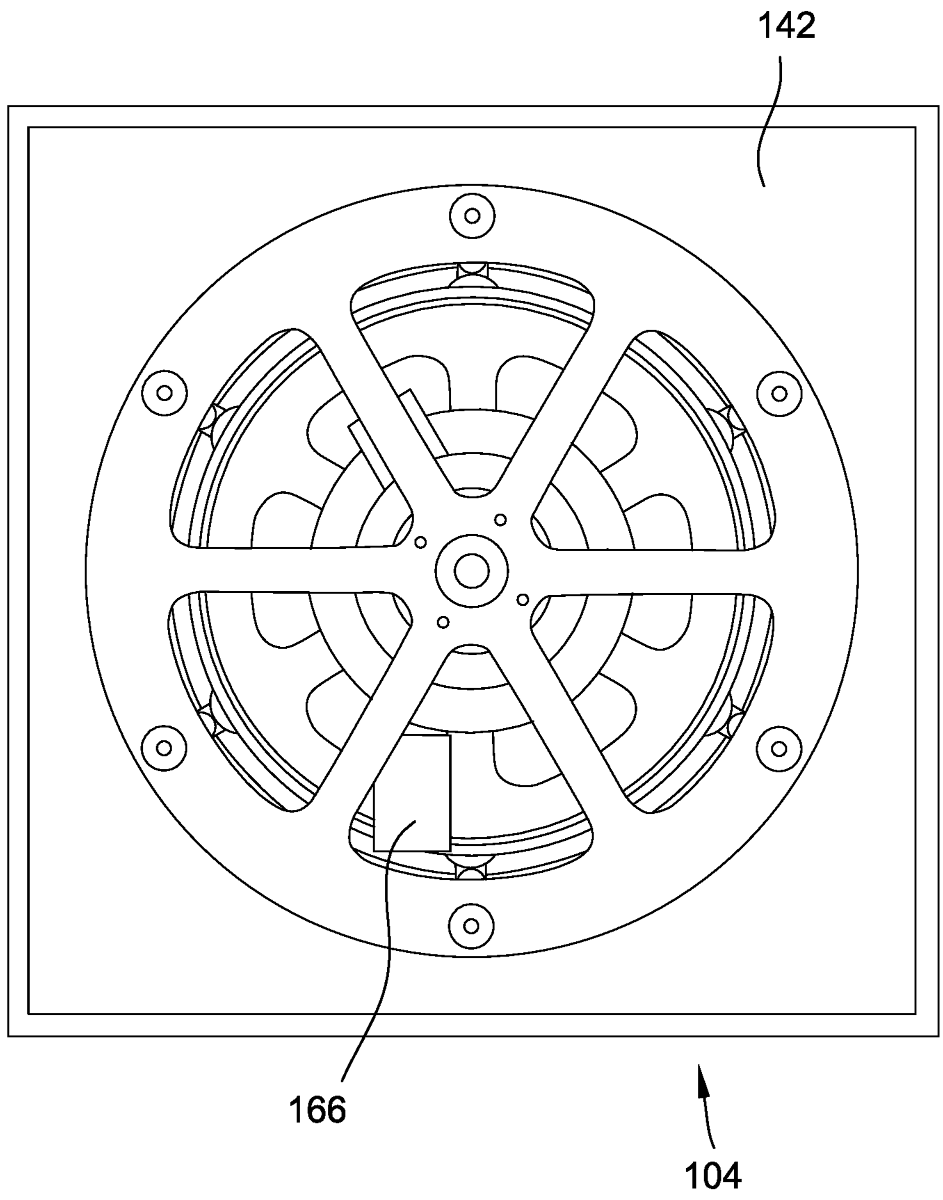
FIG. 3 is a right side view of the two structures of FIG. 1.
Figure 4:
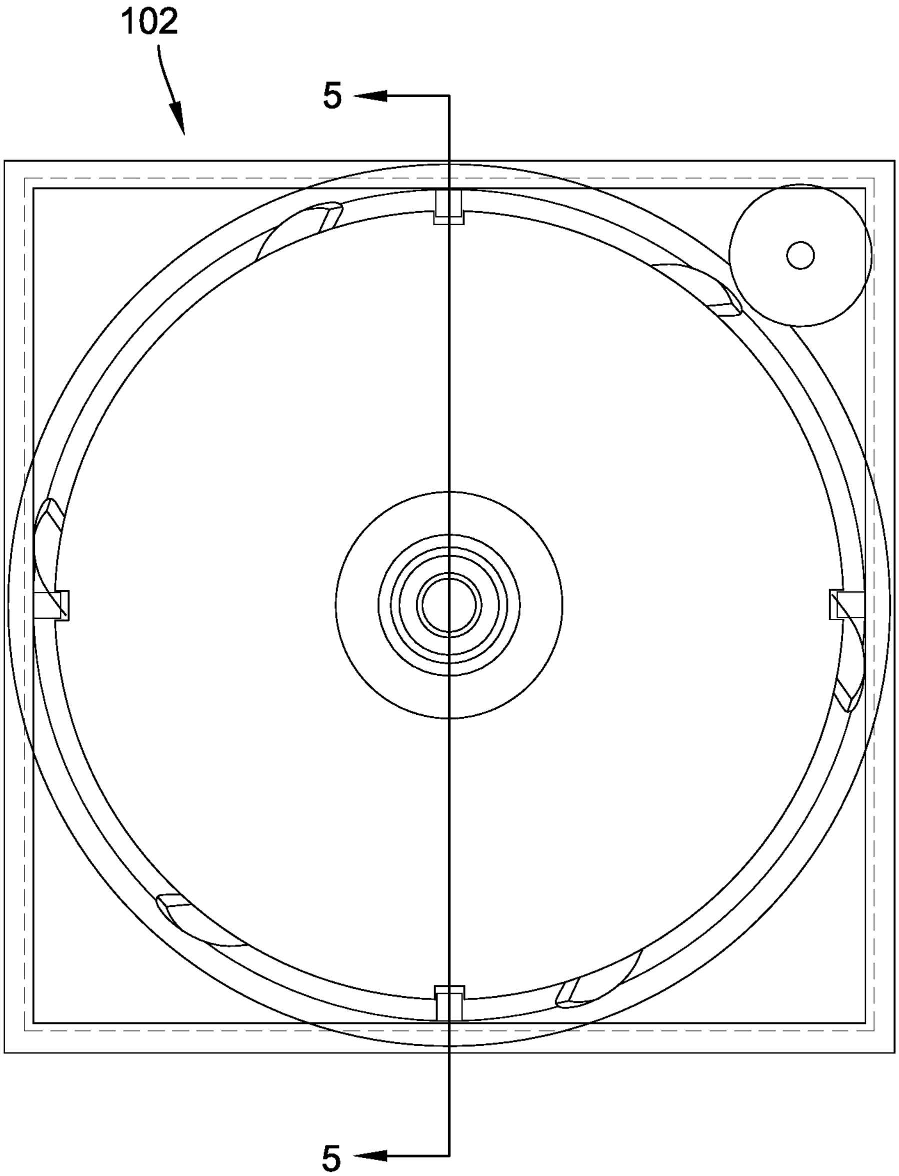
FIG. 4 is a left side view of the two structures of FIG. 1.

FIG. 1 is a perspective view of two structures 102, 104. FIG. 2 is a front view of the two structures 102, 104. FIG. 3 is a right side view of the two structures 102, 104. FIG. 4 is a left side view of the two structures 102, 104. For example, the structures 102, 104 are in-space structures, such as CubeSats, nanosatellites, and/or Evolved Expendable Launch Vehicle Secondary Payload Adapter (ESPA). For example, the in-space structures may have a size in a range of 1 CubeSat unit to 27 CubeSat units. In other embodiments, the structures 102, 104 may be other structures without departing from aspects of the disclosure. For example, the structures 102, 104 may be incorporated into and/or coupled to larger structures. In the example, the structures 102, 104 each have two opposed ends and sides extending between the opposed ends. The structures 102, 104 are secured together in an end-to-end or stacked manner. Also, in the example, the structures 102, 104 are cubes. However, the structures 102, 104 may be other sizes and shapes without departing from aspects of the disclosure. In addition, the first structure 102 may be a size and/or shape that is different than the size and/or shape of the second structure 104.

As illustrated in FIGS. 5 and 10-15, a docking system 100 is configured to connect the structures 102, 104. The docking system 100 provides for secure latching and fastening of structures for servicing, assembly, and manufacturing. The docking system 100 provides many advantages for use with in-space structures. For example, the system provides self-aligning and simple, secure connection mechanisms. The docking system 100 may be used with other structures besides in-space structures that may benefit from the system.

Figure 5:
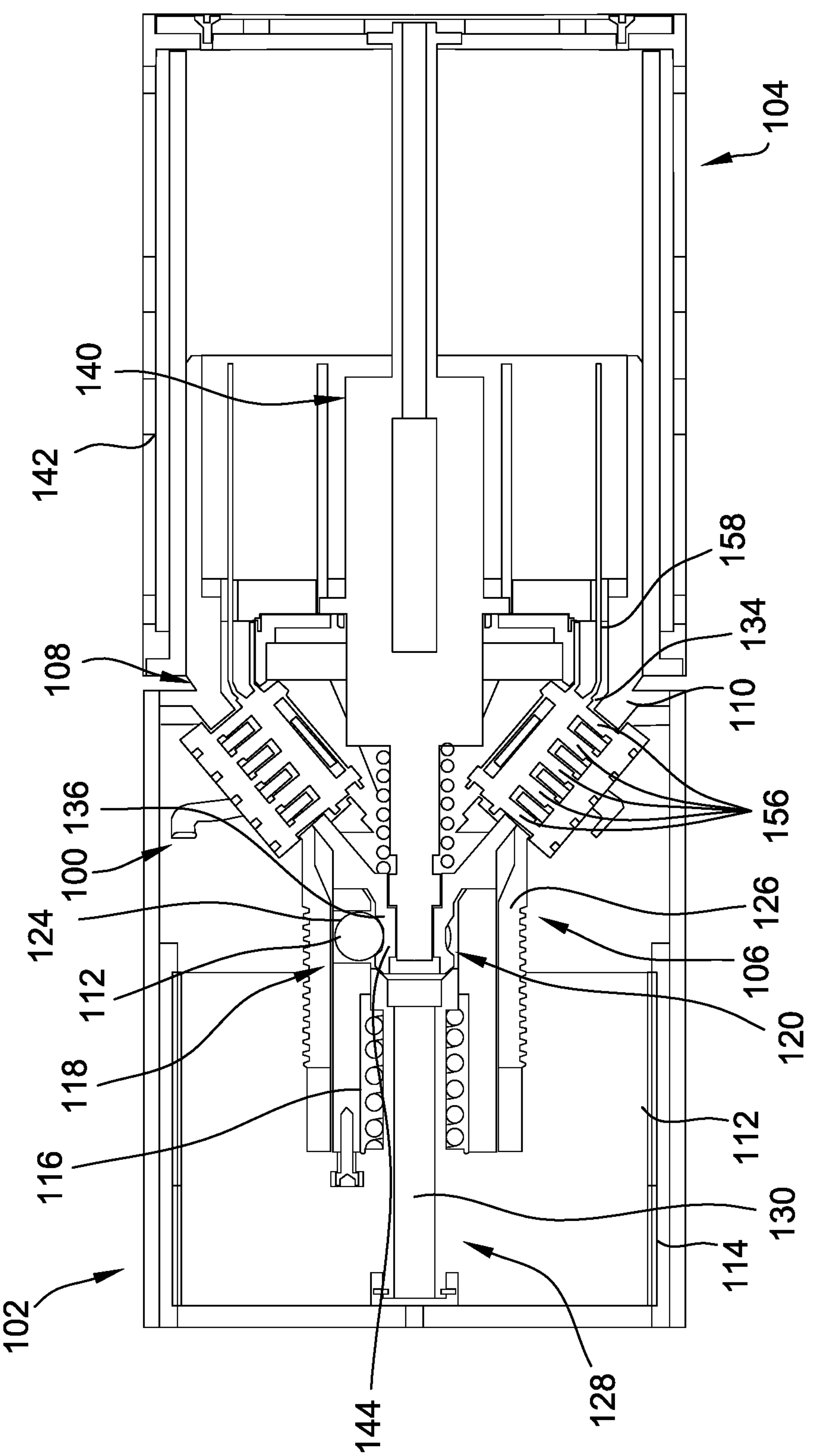
FIG. 5 is a cross-section view of the two structures taken along section line 5-5 in FIG. 4.
Figure 6A:
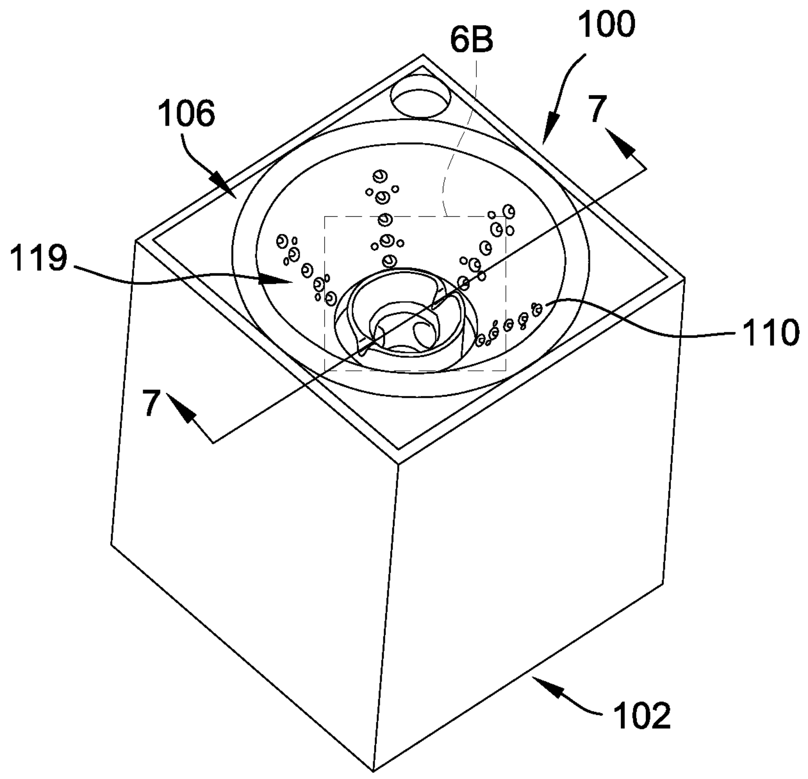
FIG. 6A is a perspective view of a first structure of the two structures of FIG. 1.
Figure 6B:
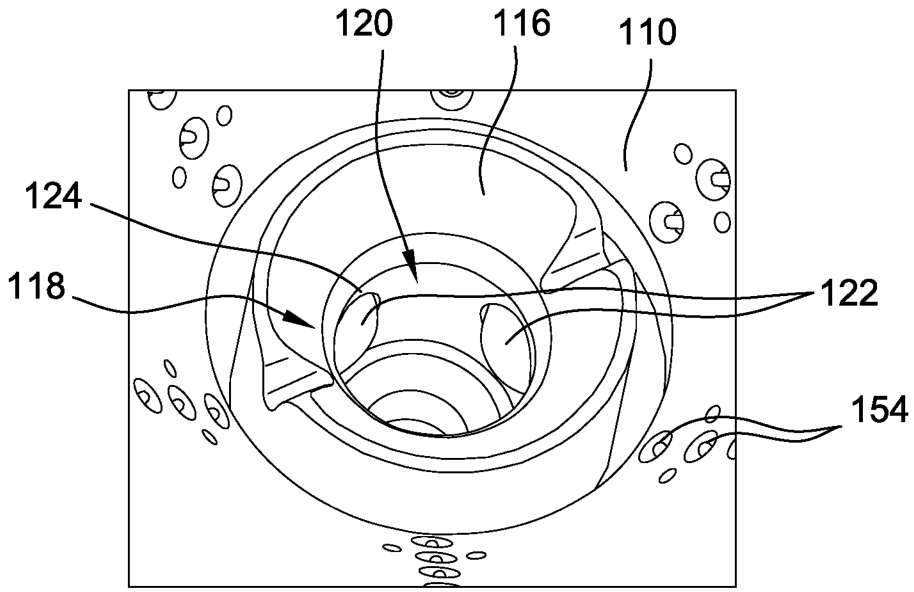
FIG. 6B is an enlarged perspective view of a portion of the first structure indicated in FIG. 6A, and illustrating components of the docking system.
Figure 7:
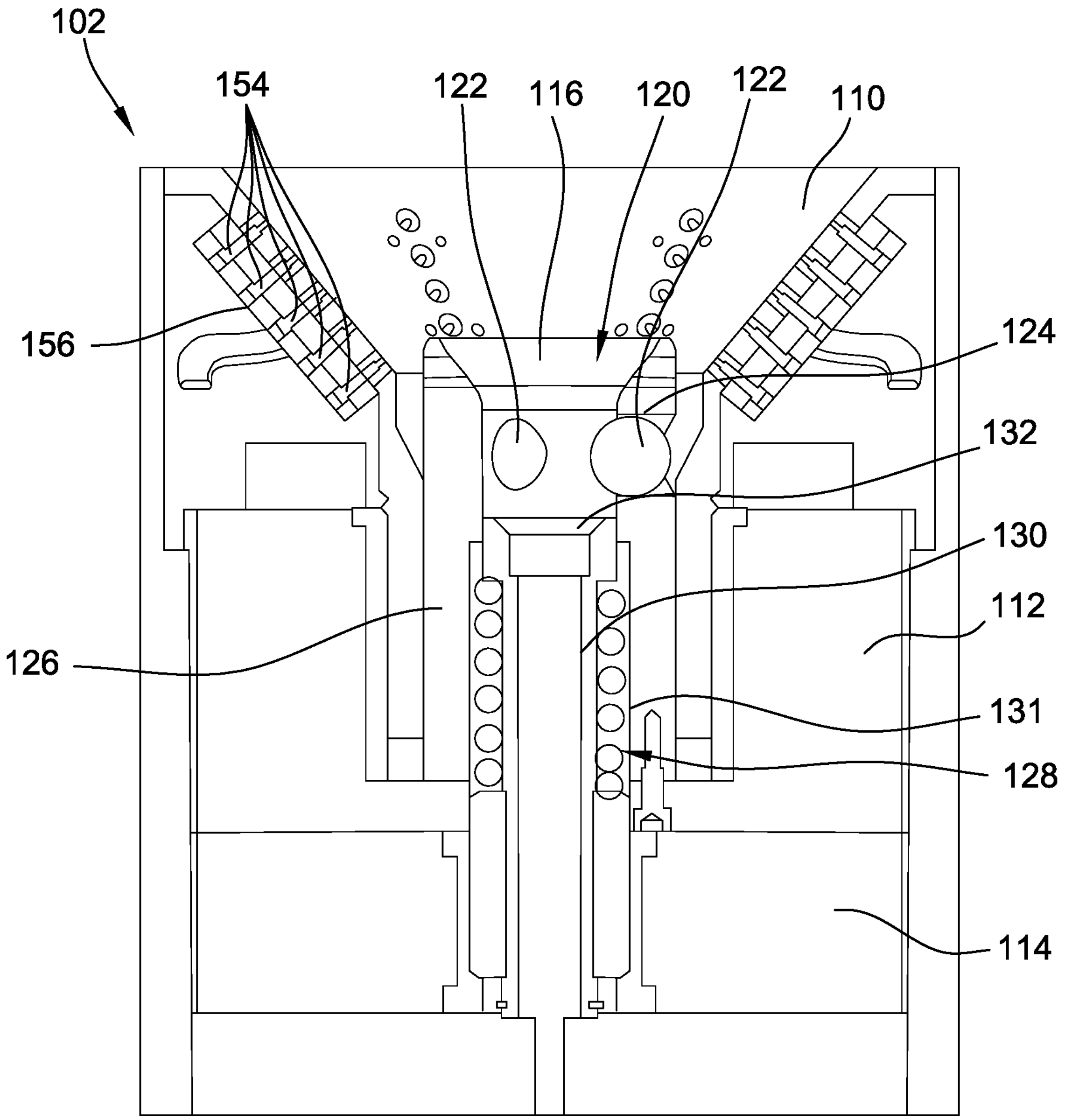
FIG. 7 is a cross-section view of the first structure taken along section line 7-7 in FIG. 6A.
Figure 8A:
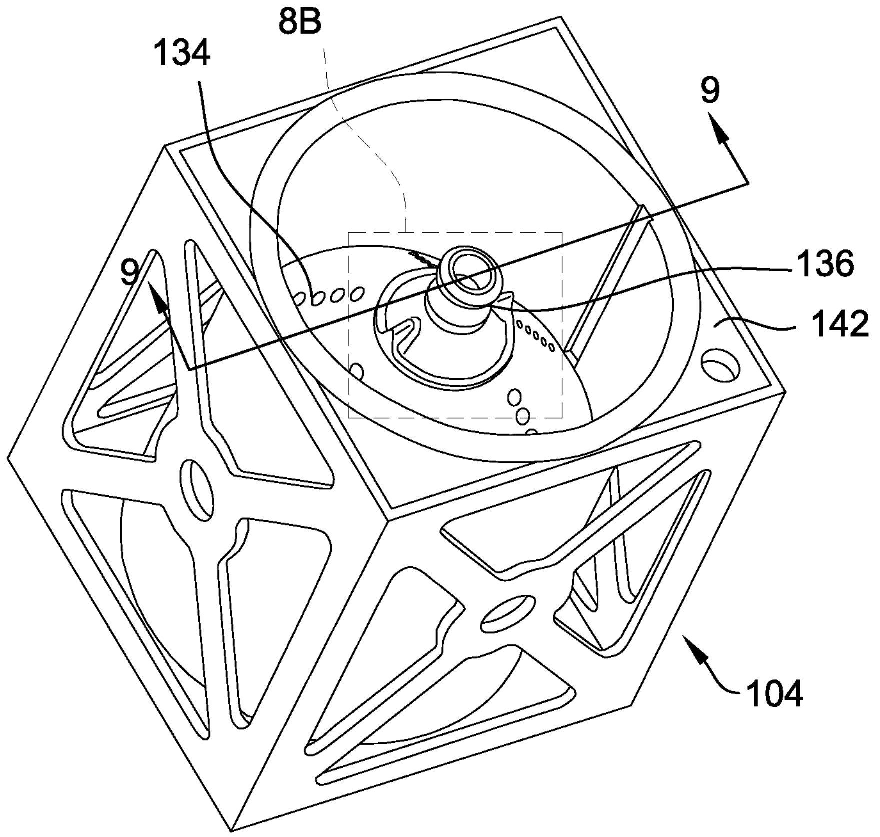
FIG. 8A is a perspective view of a second structure of the two structures of FIG. 1.
Figure 8B:
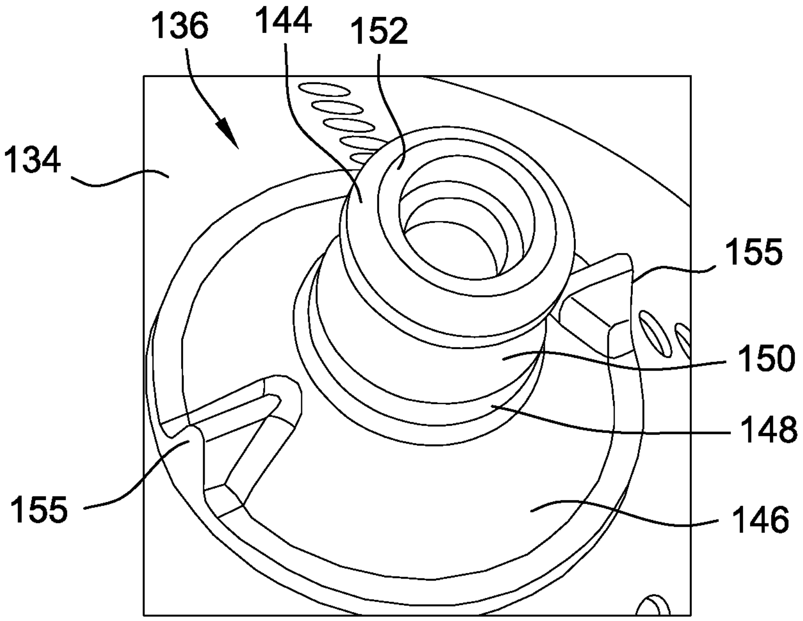
FIG. 8B is an enlarged perspective view of a portion of the second structure indicated in FIG. 8A, and illustrating components of the docking system.

Referring to FIGS. 5-7, the docking system 100 includes a first connector 106 attached to the first in-space structure 102 and a second connector 108 attached to the second in-space structure 104. The first connector 106 includes a first housing 110, a rotary actuator 112, a linear actuator 114, a sleeve 116, and an engagement mechanism 118. The first housing 110 defines a recess 119. In the illustrated example, the first housing 110 is a cone. The first housing 110 may be other shapes without departing from some aspects of the disclosure.

In the example, the sleeve 116 is a hollow cylinder and defines a recess 120. The sleeve 116 may be other shapes without departing from some aspects of the disclosure.

For example, the sleeve 116 includes a wall 117 extending around and along a central axis 129. The wall 117 defines openings 124 arranged circumferentially about the central axis 129. In the example, the sleeve 116 defines three of the openings 124 uniformly spaced around the circumference of the sleeve 116. In other embodiments, the wall 117 defines one, two, or more than three of the openings 124.

The engagement mechanism 118 may include at least one ball 122 positioned to selectively engage the second connector 108. In the example, the engagement mechanism 118 includes three of the balls 122 uniformly spaced around the circumference of the sleeve 116. The balls 122 are positioned in the openings 124 within the sleeve 116 and extend at least partly into the recess 120. For example, the wall 117 has a thickness that is less than a diameter of the balls 122, and the openings 124 have a diameter that is less than a diameter of the balls 122. Accordingly, the openings 124 are sized to receive and retain a portion of the balls 122 without the balls completely passing through the openings.

The first housing 110 includes a retainer 126 that extends around the sleeve 116 and contacts the balls 122. For example, the retainer 126 includes a sidewall 125 that extends around and is partially engaged on the wall 117 of the sleeve 116. The balls 122 are retained between the sleeve 116 and the retainer 126 of the first housing 110. The sidewall 125 extends along the central axis 129 and defines a cavity 127 sized to receive at least a portion of the balls 122 when the cavity 127 is aligned with the openings 124.

The rotary actuator 112 is coupled to the first housing 110 and configured to move at least the retainer 126 of the first housing between a first position (shown in FIG. 7) and a second position (shown in FIG. 5). For example, the rotary actuator 112 is configured to rotate and cause lateral movement of the retainer 126 of the first housing 110 through a threaded engagement between the first housing 110 and the rotary actuator 112. In other embodiments, the rotary actuator 112 may comprise a linear actuator or any other suitable actuator.

In the first position, the retainer 126 allows at least some freedom of movement of the balls 122 and allows the balls 122 to extend into or be displaced out of the recess 120. For example, the retainer 126 of the first housing 110 defines the cavity 127 that allows the balls 122 to be displaced out of the recess 120 when the retainer 126 is in the first position. The retainer 126 of the first housing 110 is translated along the central axis 129 when the first housing is moved between the first position and the second position. In the second position, the retainer 126 contacts the balls 122 and traps the balls within the openings 124. For example, the retainer 126 of the first housing 110 biases the balls 122 toward the interior of the sleeve 116 such that the balls are forced partly into the recess 120 when the first housing is in the second position. The wall 117 prevents the balls from falling completely into the recess 120. In the example, the retainer 126 moves linearly along the central axis 129 between the first position and the second position. In other embodiments, the retainer 126 may be moved in any suitable manner. For example, in some embodiments, the retainer 126 includes a plurality of the cavities 127 spaced circumferentially around the central axis 129. In such embodiments, the retainer 126 may be rotated about the central axis between a first position in which the cavities 127 are aligned with the openings 124 and a second position in which the cavities are not aligned with the openings.

In addition, the first structure 102 includes an ejection mechanism 128 for disengaging the first and second structures 102, 104. For example, the ejection mechanism 128 includes the linear actuator 114 and a push rod 130. The push rod 130 extends along the central axis 129 of the first structure 102 and is aligned with interior of the sleeve 116. The linear actuator 114 is configured to move the push rod 130 along the central axis 129 of the first structure 102 between a first position and a second position. In the first position, the push rod 130 is spaced from the sleeve 116. In the second position, the push rod 130 extends into the recess 120 of the sleeve 116. In the example, the push rod 130 includes a tip 132 that is dish-shaped and configured to facilitate contacting and displacing objects in the recess 120. The push rod 130 is biased toward the second position by a bias mechanism, e.g., a spring, 131. In other embodiments, the ejection mechanism 128 may include other actuators and/or push rods without departing from aspects of the disclosure. For example, the linear actuator 114 may comprise a rotary actuator or any other suitable actuator. In some embodiments, the actuator and/or the push rod may be omitted.

Referring to FIGS. 8A-10, the second connector 108 includes a second housing 134 and at least one connection member 136. The second housing 134 is sized to be received within the recess 119 defined by the first housing 110. In addition, the second housing 134 is shaped to match the shape of the first housing 110. For example, the first housing 110 and the second housing 134 are cones. Accordingly, the first housing 110 and the second housing 134 provide a self-aligning feature of the docking system.

In addition, the second connector 108 includes an actuator, e.g. a linear actuator, 140. The linear actuator 140 is coupled to the second housing 134 and the connection member 136. The linear actuator 140 is configured to move the second housing 134 and the connection member 136 between a stowed position (shown in FIG. 9) and an extended, engagement position (shown in FIG. 11). In the stowed position, the second housing 134 and the connection member 136 are at least partly housed within an outer housing 142 of the second structure 104. In the example, in the stowed position the second housing 134 and the connection member 136 are completely housed within an outer housing 142 of the second structure 104, i.e., no portion of the second housing 134 or the connection member 136 extends on an exterior of the outer housing 142 when in the stowed position. In the engagement position, the second housing 134 and the connection member 136 extend on an exterior of the outer housing 142 and are configured to engage the first connector 106. In addition, the second connector 108 includes a bias member, e.g., a spring, 141 extending between the linear actuator 140 and the connection member 136. In the example, the bias member 141 is configured to bias the connection member 136 toward the engagement position.

The connection member 136 is attached to a tip of the second housing 134 and extends along the central axis 129. The connection member 136 is sized to extend into the recess 120 of the sleeve 116. For example, the connection member 136 has a diameter that is less than an inner diameter of the sleeve 116. In the example, the connection member 136 comprises a protrusion 144 that is mounted on a base 146. In addition, the connection member 136 includes alignment wings 155 extending from the base 146. The alignment wings 155 are located on the base 146 on opposite sides of the protrusion 144. The alignment wings 155 are configured to engage notches in the sleeve 116 (shown in FIG. 6B) and facilitate alignment of the connection member 136 and the sleeve 116.

In the example, the protrusion 144 is a cylinder and has an outer surface 148 that extends around the axis. The outer surface 148 has a groove 150 defined therein and extending around a circumference of the protrusion 144. The groove 150 is sized and shaped to receive the balls 122 (shown in FIG. 6B). For example, the groove 150 is curved with a radius that matches a radius of the balls 122. Moreover, the tip of protrusion 144 includes an end surface 152 that extends radially inward from outer surface 148. In the example, the end surface 152 is annular. The tip of the protrusion 144 is arranged to facilitate engagement with the push rod 130 (shown in FIG. 11) or another component such as a fuel coupling.

FIG. 5 is a cross-section view of the two structures 102, 104 secured together by the docking system 100. The first structure 102 includes the first connector 106 and the second structure 104 includes the second connector 108. The second housing 134 of the second connector 108 is positioned within the recess 119 defined by the first housing 110 of the first connector 106 and the engagement mechanism 118 of the first connector 106 engages the connection member 136 of the second connector 108. As seen in FIG. 5, the engagement mechanism 118 is configured to engage the connection member 136 when the connection member 136 is in the engagement position and the second housing is in the recess 119 of the first housing 110. For example, the sleeve 116 is sized to receive the protrusion 144 of the connection member 136. The balls 122 are configured to extend into the groove 150 on the protrusion 144 to secure the connection member 136 and the sleeve 116 together.

Figure 9:
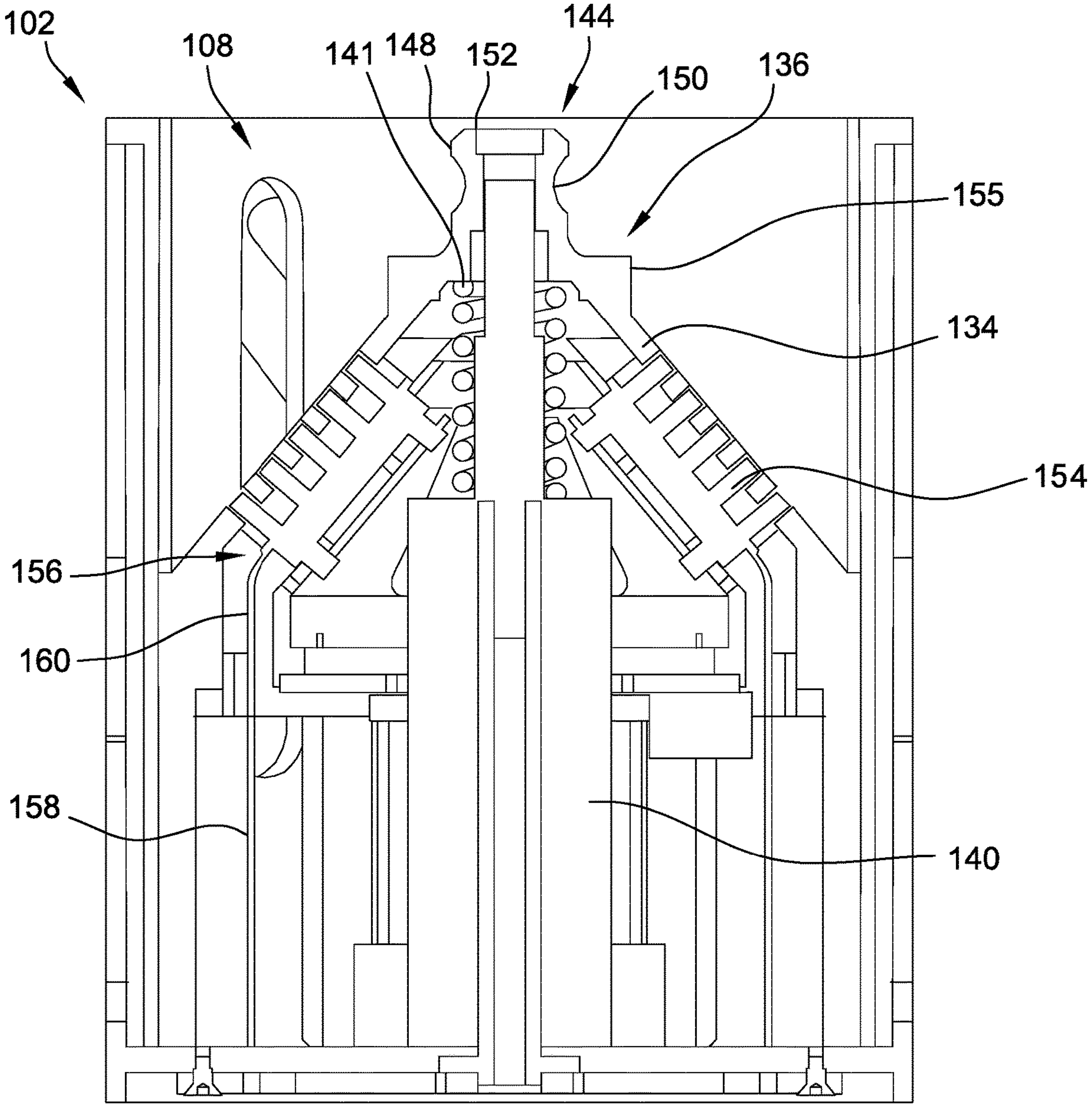
FIG. 9 is a cross-section view of the second structure taken along section line 9-9 in FIG. 8A.
Figure 10:
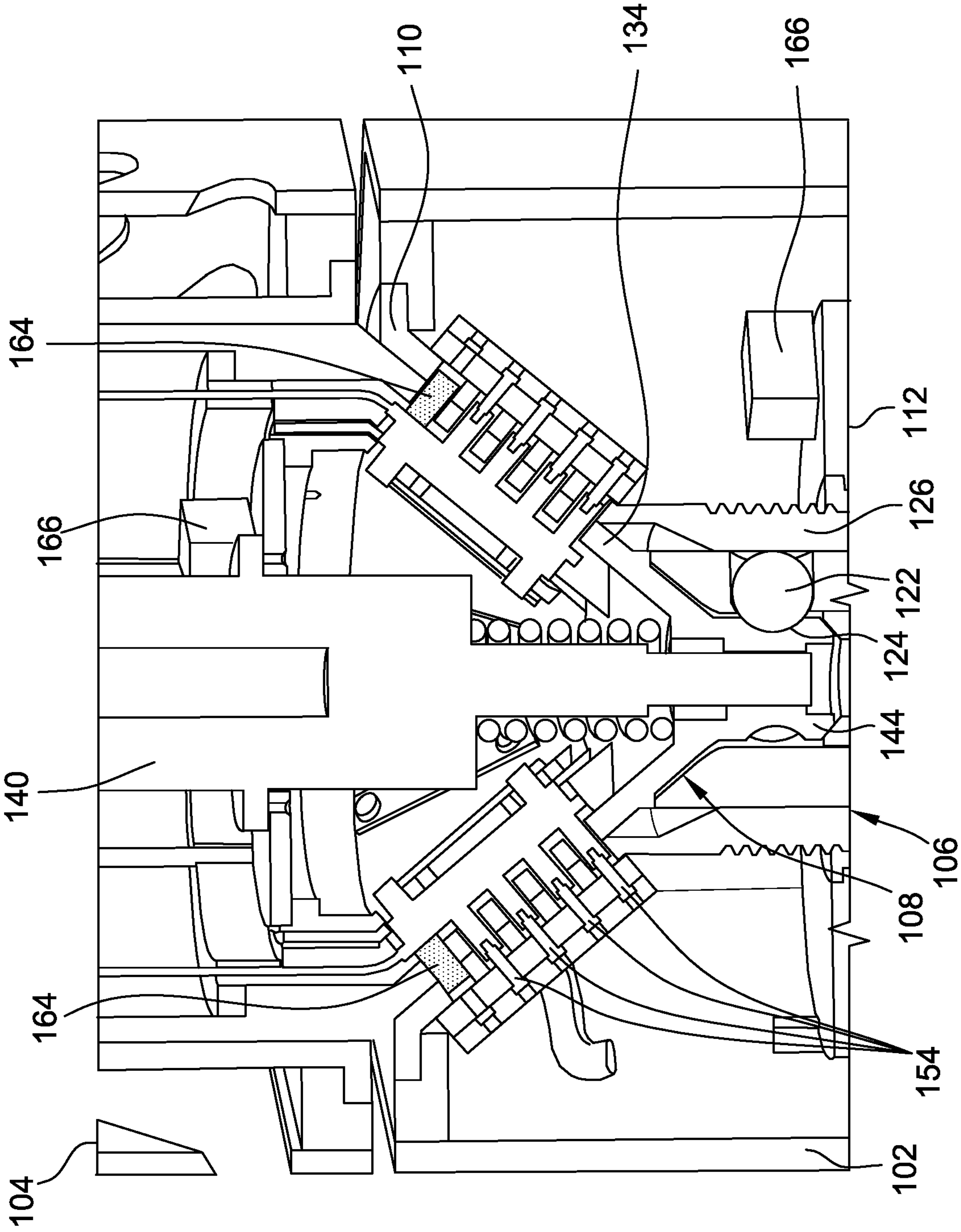
FIG. 10 is an enlarged cross-section view of a portion of the first structure secured to the second structure.
Figure 11:
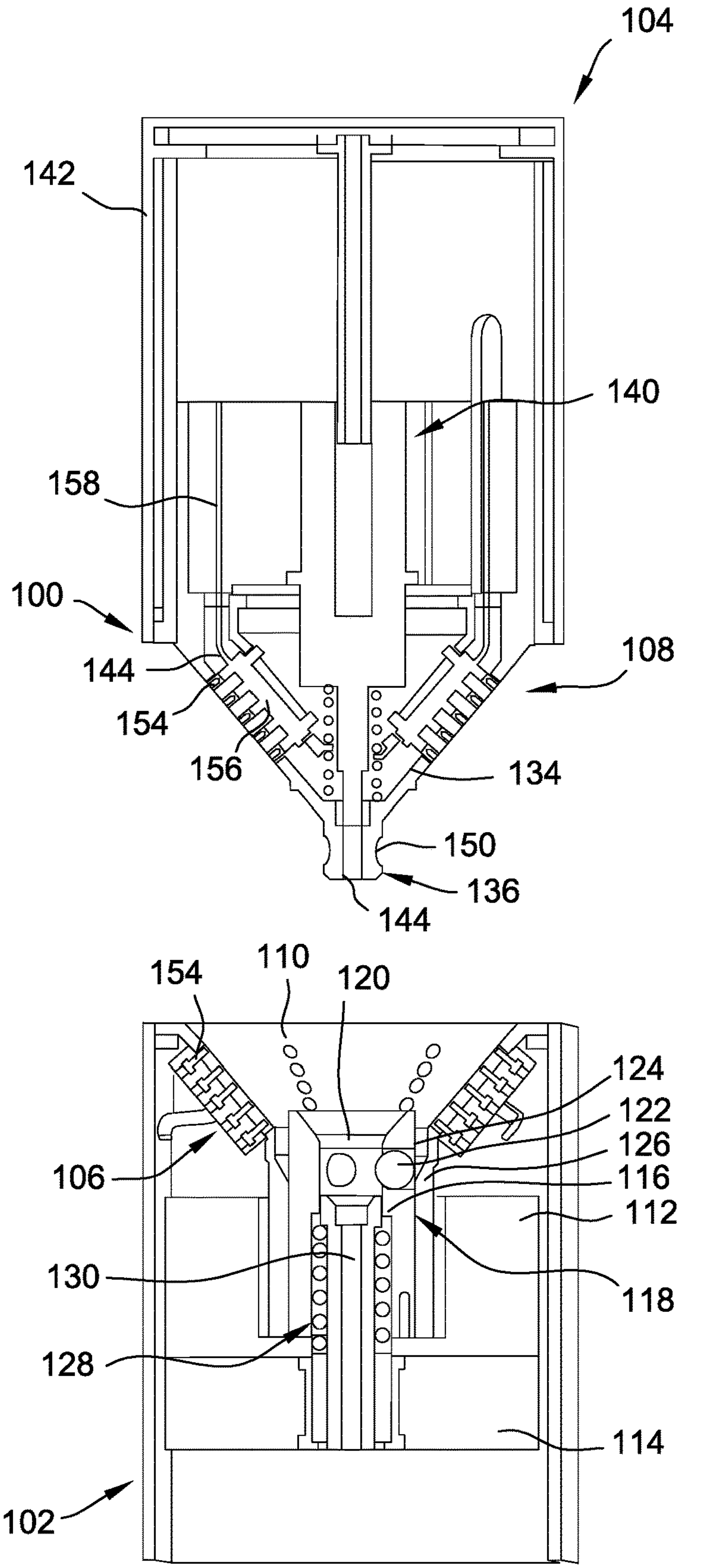
FIG. 11 is a cross-section view of the two structures of FIG. 1 separated from each other.
Figure 12A:
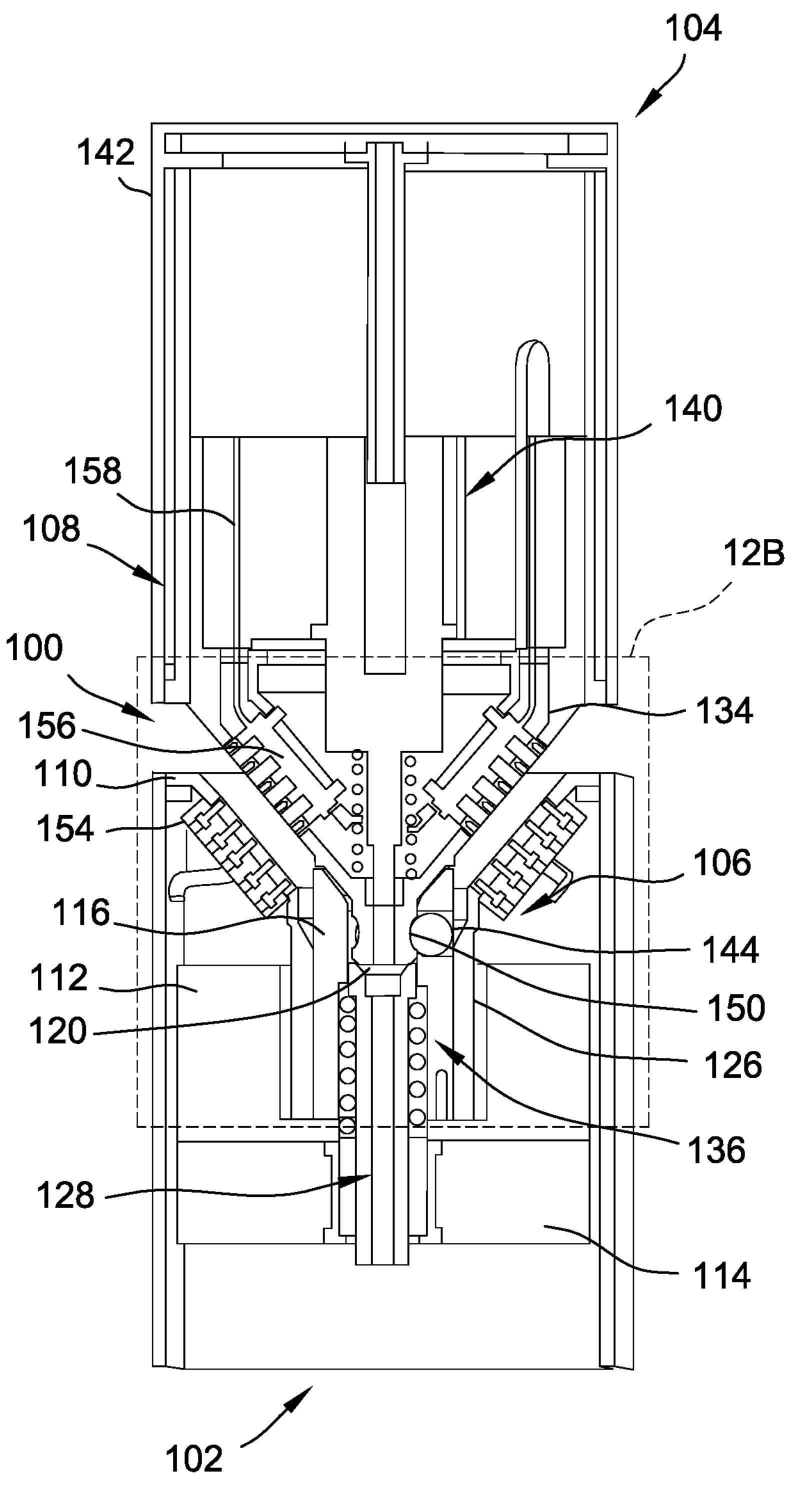
FIG. 12A is a cross-section view of the first and second structures being positioned relative to each other for a first connector on the first structure to engage a second connector on the second structure.
Figure 12B:
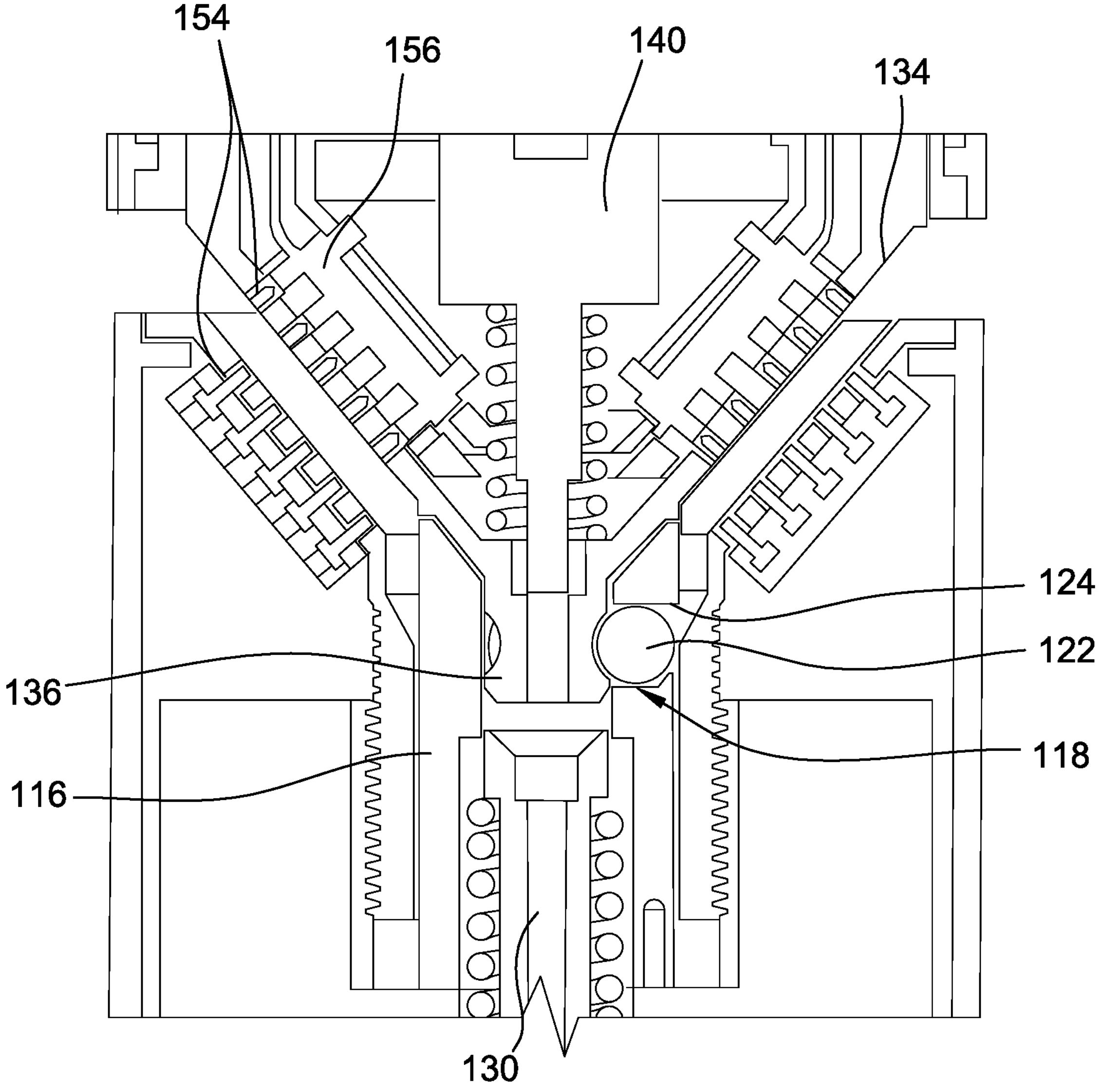
FIG. 12B is an enlarged cross-section view of a portion of the first and second structures indicated in FIG. 12A.

With reference to FIGS. 9-11, the first connector 106 and the second connector 108 each include electrical contacts 154 that are configured to provide an electrical connection between the first structure 102 and the second structure 104. For example, the electrical contacts 154 each include conductors that allow electrical current to flow through when the conductors are in contact with another conductor. Each electrical contact 154 on the first structure 102 is paired with a corresponding electrical contact 154 on the second structure 104.

Each electrical contact 154 may extend along an axis and have elongated casing or housing that protects the conductors. In the example, the electrical contacts 154 on the first connector 106 and the electrical contacts 154 on the second connector 108 are positionable between a stowed position and an engagement position. The electrical contacts 154 may be biased toward the engagement position by a bias mechanism such as a spring. In the engagement position, the electrical contacts 154 extend through openings in the first housing 110 and the second housing 134 to provide an electrical connection between electrical components. The electrical contacts 154 may provide connections for power and/or data transfer between the structures 102, 104.

In addition, two or more of the electrical contacts 154 on the first connector 106 or the second connector 108 may be attached together. For example, in the illustrated embodiment, the respective electrical contacts 154 of the first connector 106 and the second connector 108 are arranged in groups of four or five electrical contacts that are attached together. In the example, the first connector 106 and the second connector 108 each include six groups of the contacts 154. The groups of electrical contacts 154 may be connected by a base assembly 156, e.g., a busbar and/or a housing, connected to the respective housing. One or more cables 158 may be connected to the base assembly 156 and/or directly to the electrical contacts 154 to provide electrical connection to the electrical components in the first and second structures 102, 104.

In the example, the base assembly 156 for the electrical contacts 154 of the second connector 108 is connected to a movable base 160. The movable base 160 may be constructed out of a flexible material to provide some flex for the electrical contacts 154 and facilitate engagement even if electrical contacts are perfectly aligned with each other. The movable base 160 is connected to the linear actuator 140 that is configured to move the movable base 160 of the second connector 108 linearly and displace the electrical contacts 154 between a stowed position in which the electrical contacts 154 are not accessible from an exterior of the second housing 134 and an extended, engagement position in which the electrical contacts 154 extend through the openings in the second housing 134 and are configured to engage the electrical contacts 154 of the first housing 110.

In addition, with reference to FIG. 10, the docking system 100 may include shear connector pins 164 that are configured to secure the first housing 110 to the second housing 134 when the second housing 134 is received within the first housing 110. Each shear connector pin 164 is a cylinder that is sized to be positioned in openings in the first and second housing 110, 134. The shear connector pins 164 resist shear forces between the housings 110, 134 and provide torsional stability. In the example, the shear connector pins 164 are positioned adjacent the electrical contacts 154 and reduce shear forces on the electrical contacts 154 when the first and second housings 110, 134 are secured together. For example, the shear connector pins 164 may be connected to and/or retained in position by the base assemblies 156. In one embodiment shown in FIG. 10, the shear connector pins 164 replace one of the electrical contacts 154 in two or more of the groups of electrical contacts.

Also, with reference to FIG. 10, the docking system 100 may include one or more sensors that facilitate engagement of the first and second connectors 106, 108 and/or provide information regarding the state of the docking system 100 and/or the structures 102, 104. For example, the docking system 100 includes at least one proximity sensor 166 configured to detect a position of the first connector 106 relative to the second connector 108. In the example, a first proximity sensor 166 is attached to the rotary actuator 112 of the first connector 106 and a second proximity sensor 166 is attached to the second connector 106. The proximity sensors 166 detect movement of the first and second connectors 106, 108 and provide information regarding the movement of the connectors 106, 108 and the positions of each relative to the other. In addition, the docking system 100 includes a sensor 168 (shown in FIG. 2) coupled to at least one of the first housing 110 and the second housing 134 and configured to provide a signal related to a force between the first housing 110 and the second housing 134. For example, in the illustrated example, the sensor 168 is a strain gauge and is connected to the first housing 110.

FIGS. 11-14B illustrate a method of connecting in-space structures. First, the second connector 106 is moved to the second engaged position by the linear actuator 140. Then the first in-space structure 102 is moved relative to the second in-space structure 104 to position the first connector 106 relative to the second connector 108. For example, the docking system and/or the structures 102, 104 may be actuated remotely to achieve desired positions. Suitably, the structures 102, 104 are positioned such that the second housing 134 is positioned within the recess 119 defined by the first housing 110. The configuration of the docking system 100 provides for self-alignment and simplifies the positioning of the structures 102, 104 for securement. The protrusion 144 is positioned within the recess 120 of the sleeve 116 and the engagement mechanism 118 engages the protrusion 144 on the second housing 134. For example, the balls 122 of the engagement mechanism 118 extend into the groove 150 to secure the connection member 136 and the sleeve 116 together, as shown in FIG. 12B. The rotary actuator 112 moves the first housing 110 relative to the sleeve 116 such that the balls 122 and the protrusion 144 are captured in the secured position, as shown in FIG. 13A.

Figure 13A:
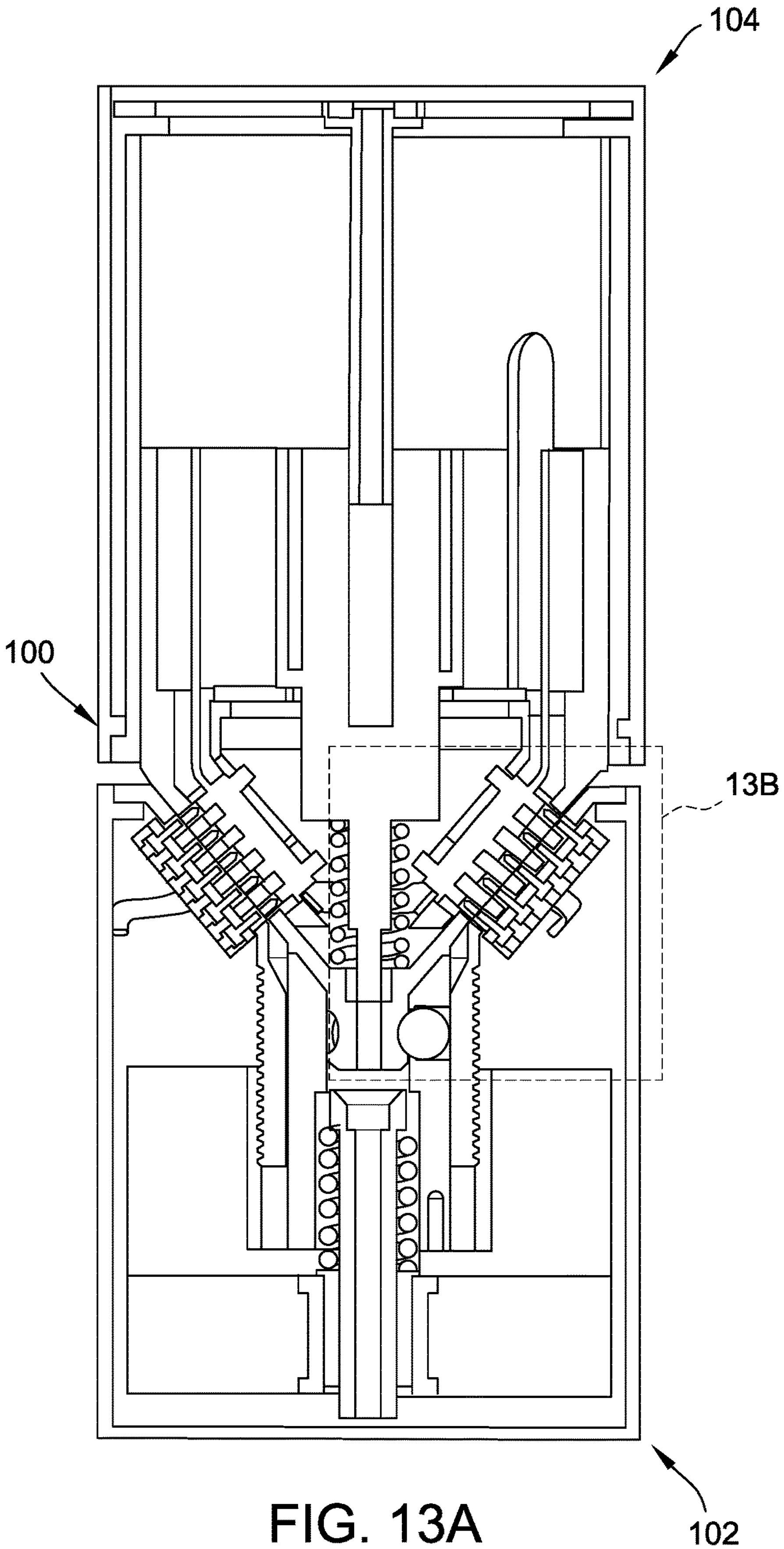
FIG. 13A is a cross-section view of the first and second structure illustrating a first housing of the first structure receiving a second housing of the second structure and electrical contacts positioned relative to each other.
Figure 13B:
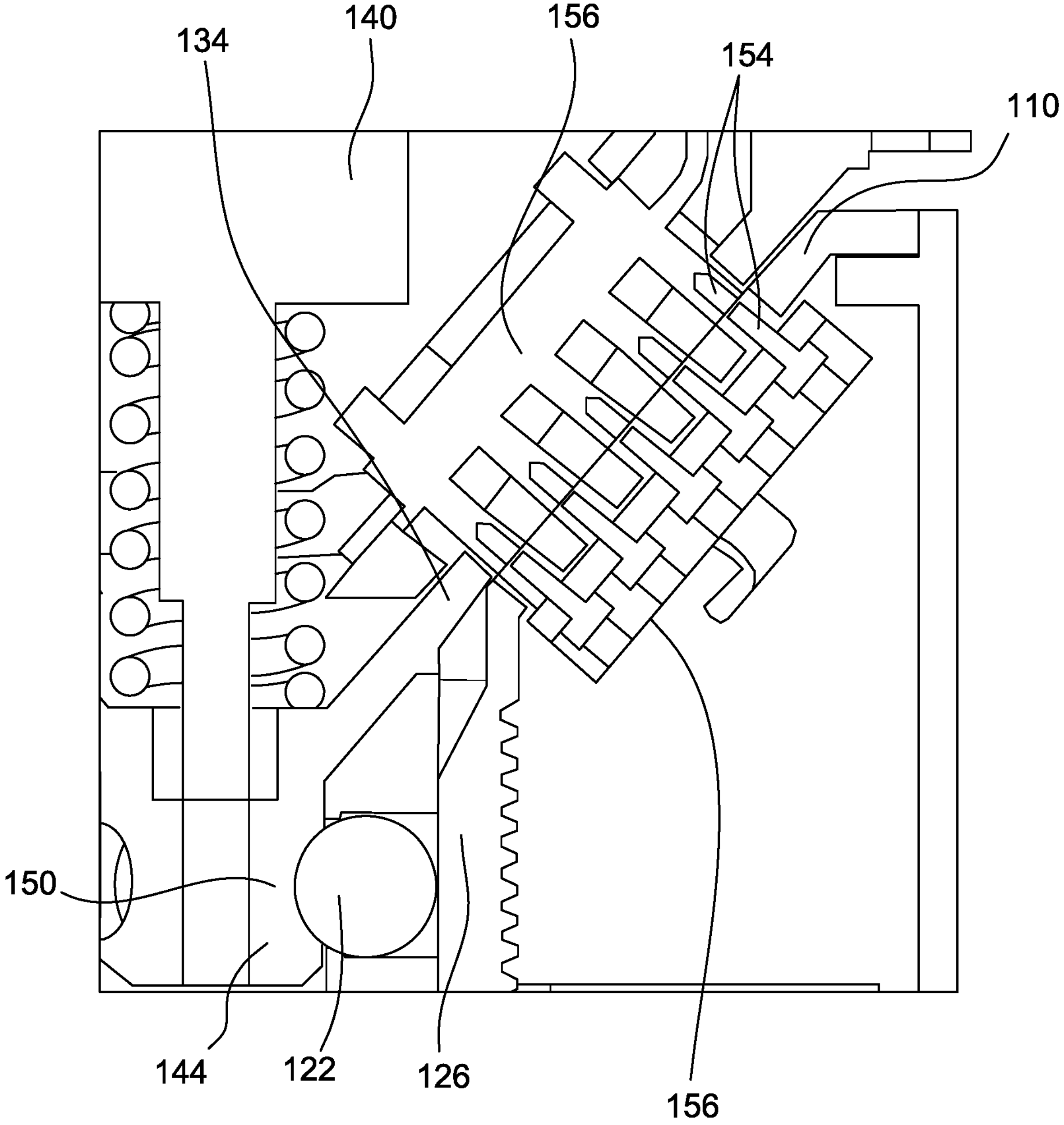
FIG. 13B is an enlarged cross-section view of a portion of the first and second structures indicated in FIG. 13A.
Figure 14A:
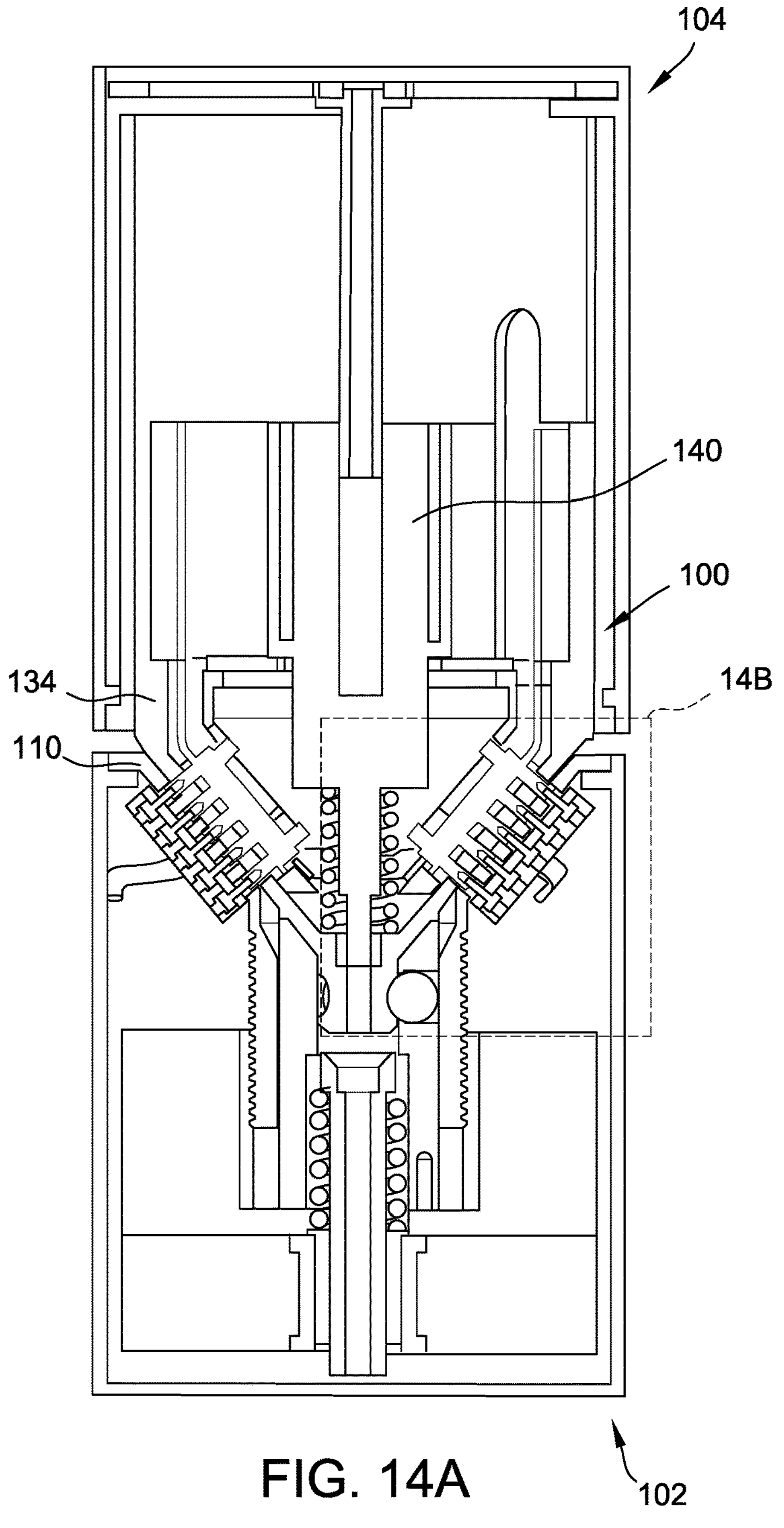
FIG. 14A is a cross-section view of the first and second structure illustrating the second housing of the second structure received in the first housing of the first structure and electrical contacts on the second housing engaging electrical contacts on the first housing.
Figure 14B:
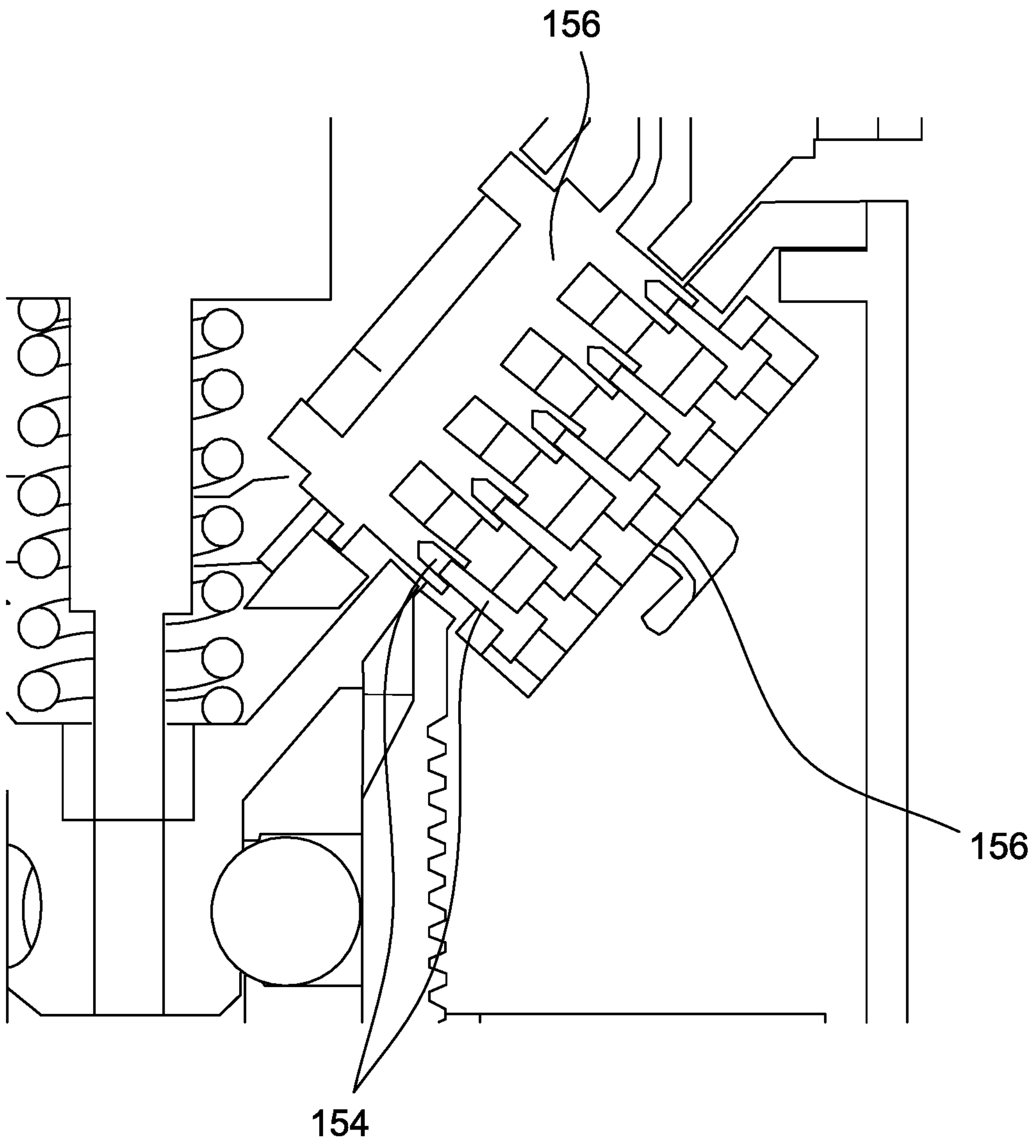
FIG. 14B is an enlarged cross-section view of a portion of the first and second structures indicated in FIG. 14A.

In addition, as illustrated in FIG. 13B, the electrical contacts 154 on the first housing 110 are positioned into alignment with the electrical contacts 154 on the second housing 134 when the rotary actuator 112 moves the first housing 110 into the engagement position. The electrical contacts 154 of the second housing 134 are then moved to engage the electrical contacts 154 and provide a secure electrical connection. For example, the linear actuator 140 on the second structure 104 moves the base assembly 156 of the second connector 108 linearly to displace the electrical contacts 154 between a stowed position in which the electrical contacts 154 are not accessible from an exterior of the second housing 134 and an extended position in which the electrical contacts 154 extend through the openings in the second housing 134 and engage the electrical contacts 154 of the first housing 110, as shown in FIG. 14B.

Figure 15A:
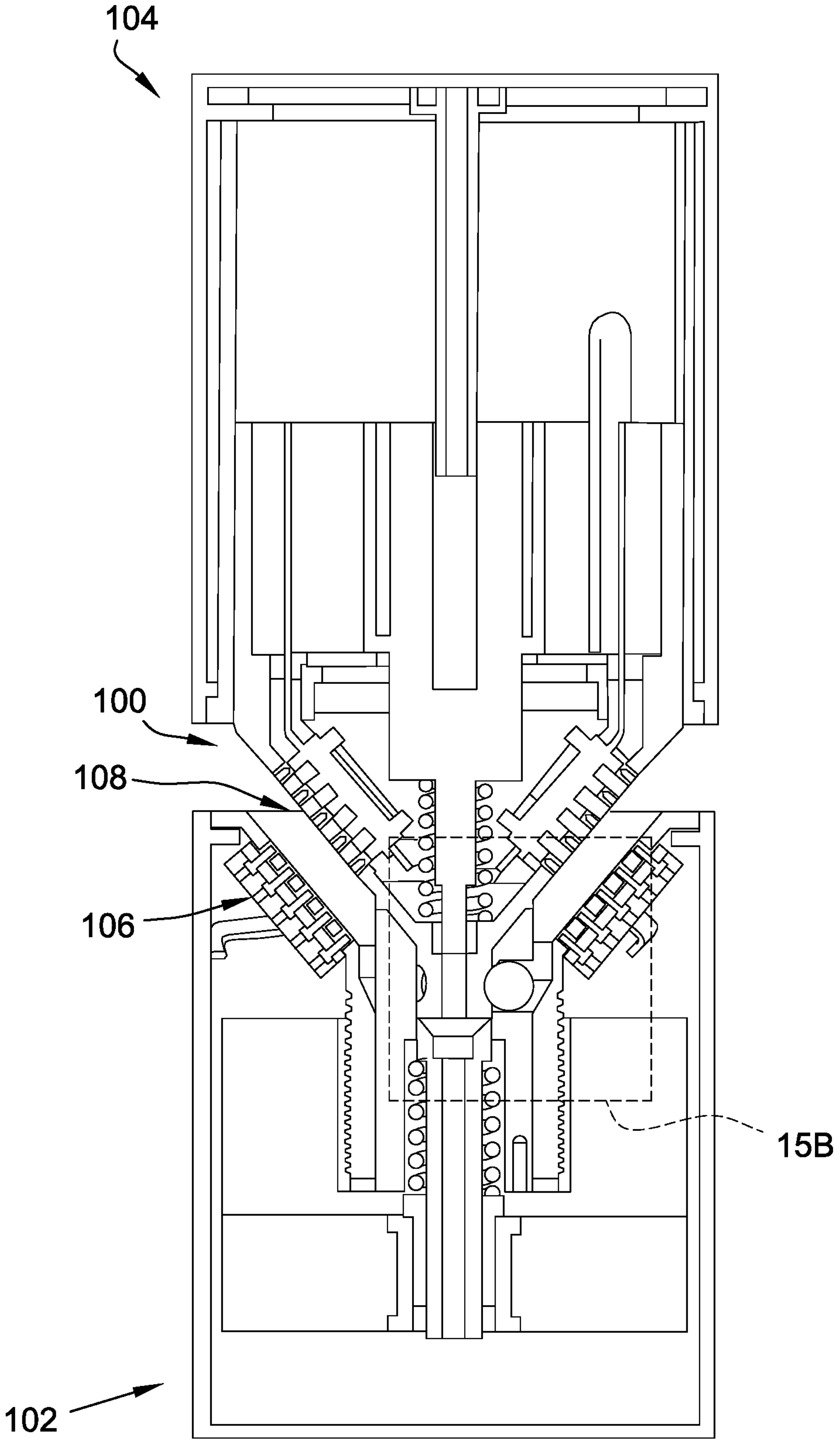
FIG. 15A is a cross-section view of the first and second structures illustrating an ejection mechanism for disengaging the first and second structures.
Figure 15B:
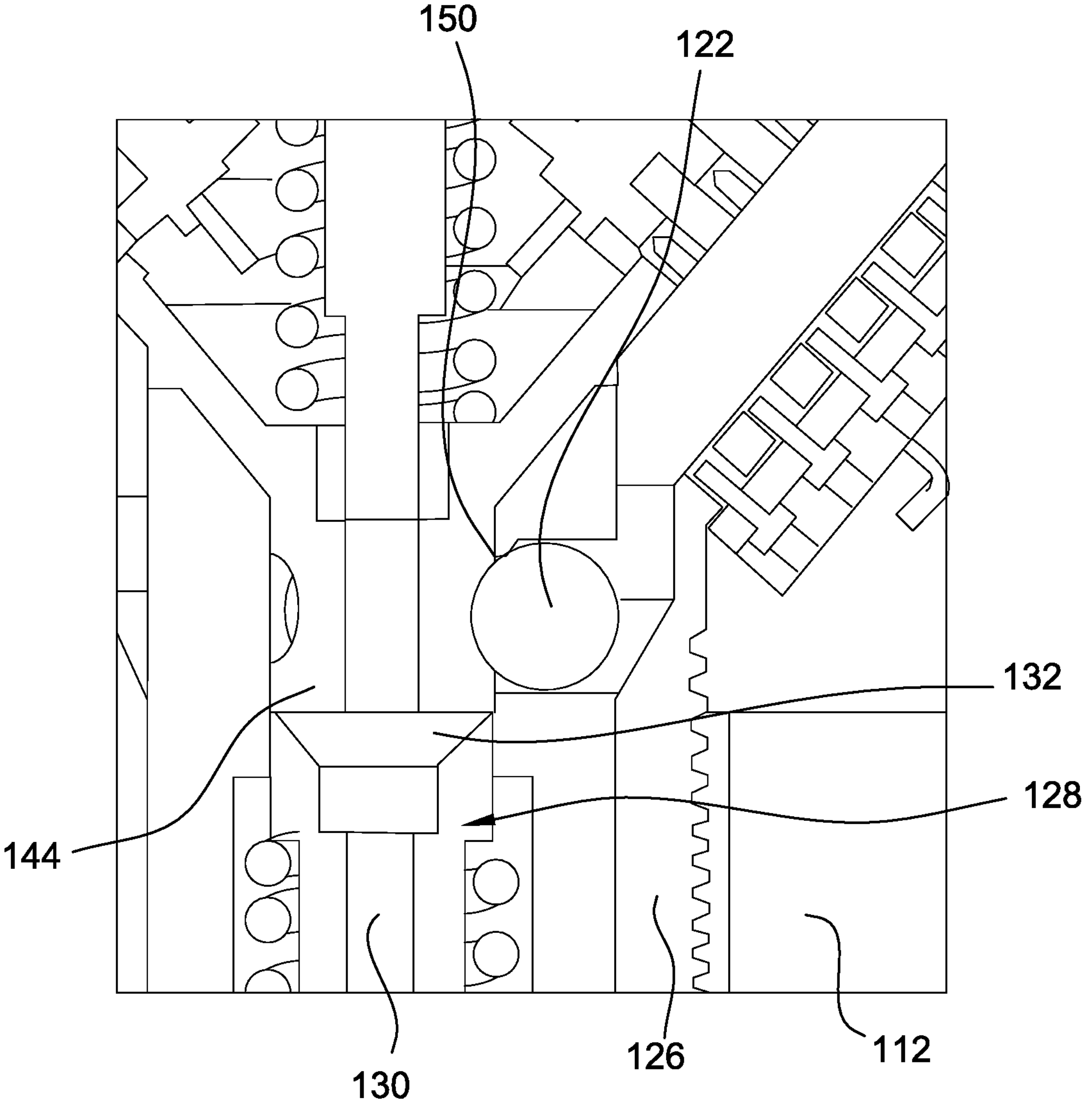
FIG. 15B is an enlarged cross-section view of a portion of the first and second structures indicated in FIG. 15A.

FIGS. 15A and 15B illustrate the ejection mechanism 128 disengaging the first and second structures 102, 104. Initially, the linear actuator 140 moves the electrical contacts 154 of the second connector 108 into the stowed position. As a result, the electrical contacts 154 of the second connector 108 are disengaged from the electrical contacts 154 of the first connector 106. In some embodiments, the shear connector pins 164 are removed from openings when the electrical contacts 154 are stowed.

After disconnection of any electrical contacts 154, the engagement mechanism 118 is disengaged from the second connector 108. For example, the rotary actuator 112 moves the first housing 110 relative to the sleeve 116 to release the balls 122 and enable the balls to be displaced when the protrusion 144 is displaced. Simultaneously or subsequently, the linear actuator 114 moves the push rod 130 along the central axis 129 of the first structure 102 to engage the protrusion 144 within the recess 120 of the sleeve and to move the protrusion 144 past the balls 122 such the connection member 136 is released from the engagement mechanism 118. The first and second structures 102, 104 are then disconnected from each other and may be moved relative to each other to desired positions.

Figure 16:
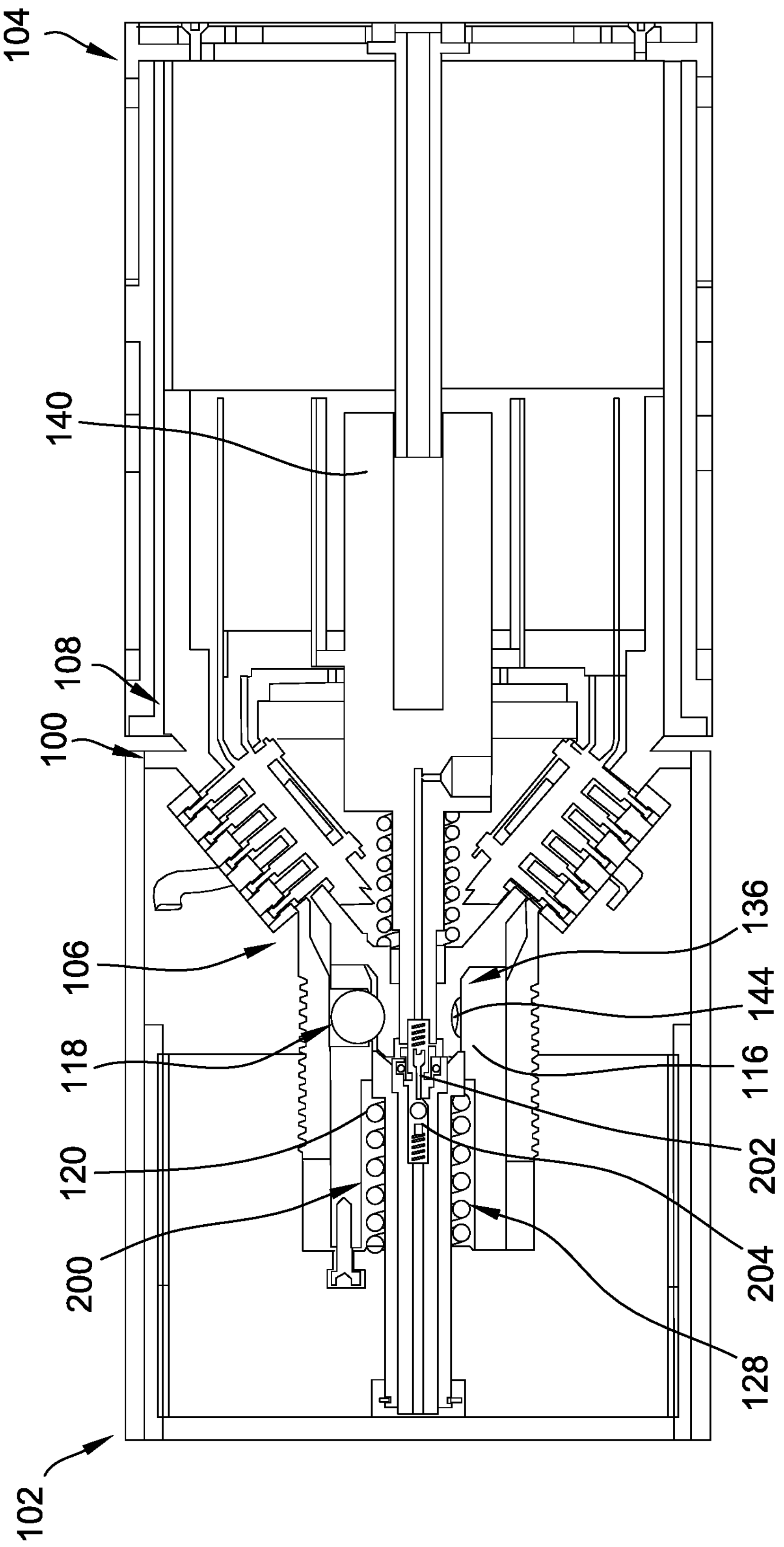
FIG. 16 is a cross-section view of a first structure and a second structure secured together using a connector including a fluid dispenser.
Figure 17A:
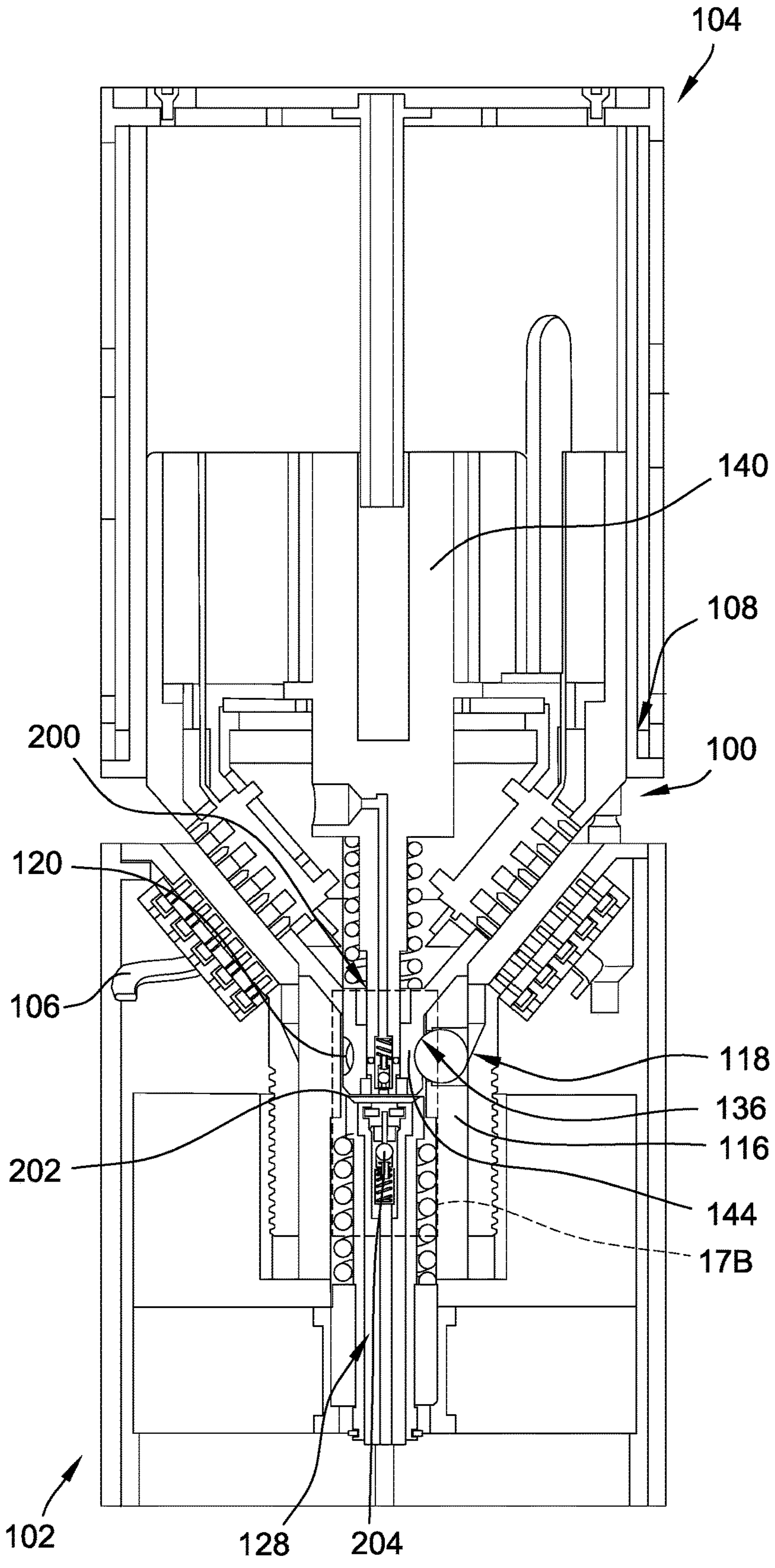
FIG. 17A is a cross-section view of the first and second structures of FIG. 16 being positioned relative to each other for a first connector on the first structure to engage a second connector on the second structure.
Figure 17B:
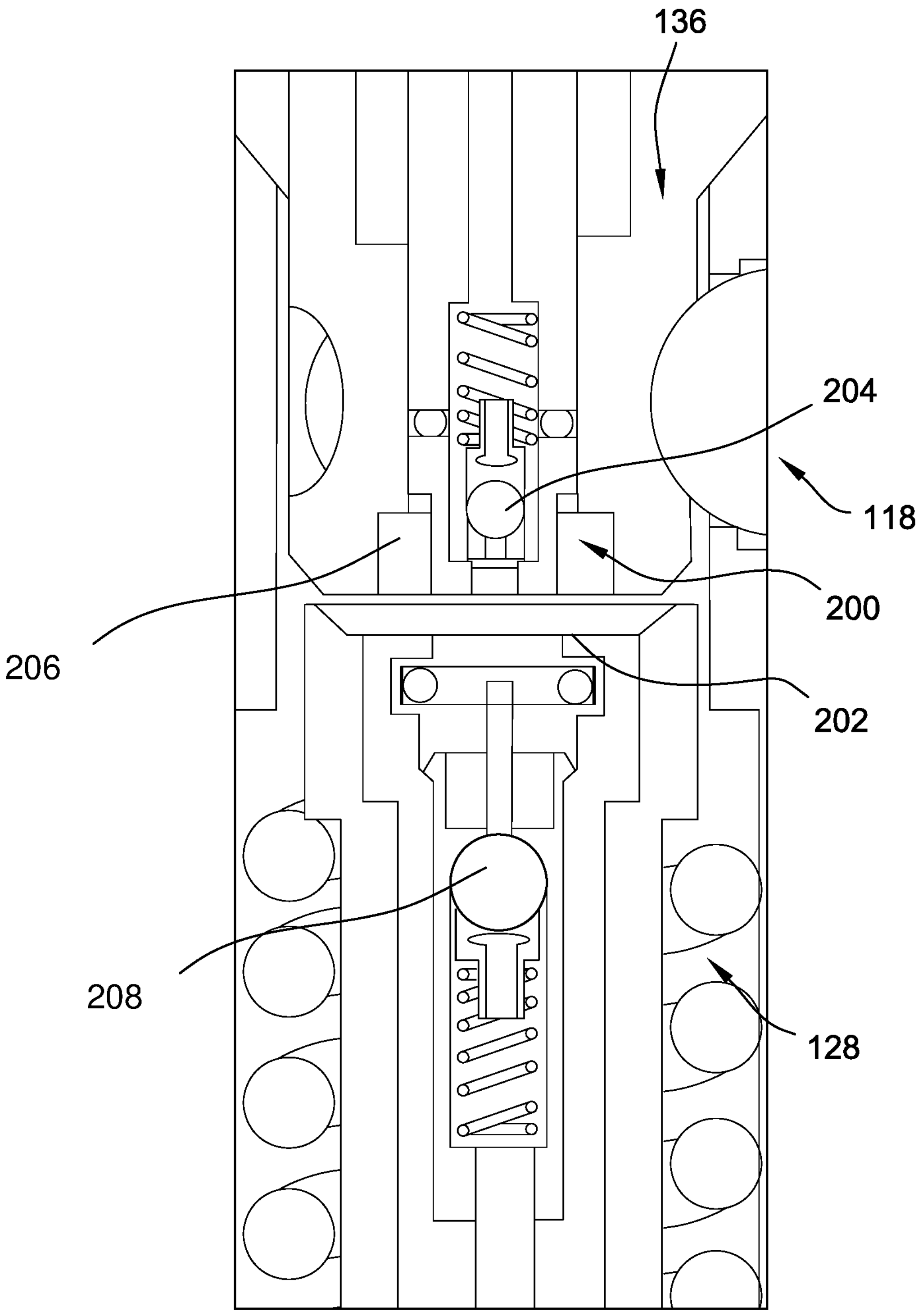
FIG. 17B is an enlarged cross-section view of a portion of the first and second structures indicated in FIG. 17A.
Figure 18:
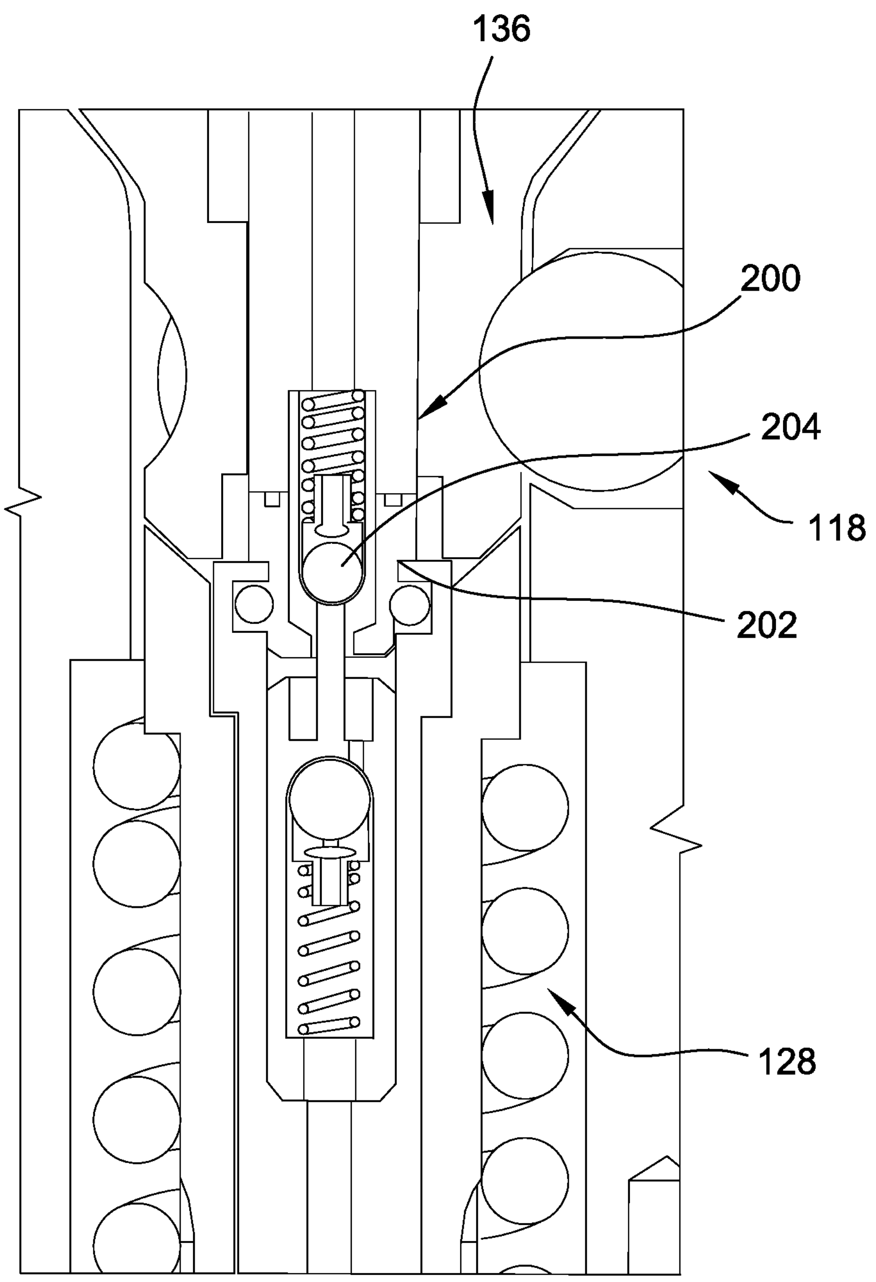
FIG. 18 is an enlarged cross-section view of a portion of the first and second structures of FIGS. 16-17B and illustrating the first connector secured to the second connector and the fluid dispenser arranged to dispense fuel from the second structure to the first structure.

FIG. 16-18 illustrate an embodiment of the docking system 100 including a fluid transfer system. The fluid transfer system includes a fluid dispenser 200 and a fluid inlet 202. In the example, the fluid dispenser 200 and the fluid inlet 202 are connected to fluid sources and/or fluid reservoirs and arranged for transferring fluid between the first structure 102 and the second structure 104. For example, the fluid dispenser 200 is connected to a fluid source on the second structure 104. The fluid inlet 202 is connected to a fluid reservoir. In other embodiments, the fluid dispenser 200 may be located on the first structure 102 and/or the fluid inlet 202 may be located on the second structure 104.

The fluid dispenser 200 extends through the connection member 136 and is configured to dispense a fluid, e.g., fuel. The fluid may include materials in a liquid and/or a gas state. The fluid dispenser 200 is positionable between a first, stowed position (shown in FIG. 17A) and a second, extended position (shown in FIG. 18). For example, the fluid dispenser 200 may be moved by the linear actuator 140 on the second structure 104 or another actuator.

The fluid inlet 202 extends through a bore in the ejection mechanism 128 and is configured to receive fluid dispensed from the fluid dispenser 200. The fluid dispenser 200 is configured to engage the fluid inlet 202 when the fluid dispenser 200 is in the second position and the second connector 108 is secured to the first connector 106, e.g., the protrusion 144 of the second connector 108 is engaged within the recess 120 of the sleeve 116 of the first connector 106. The fluid inlet 202 is positioned within the sleeve 116 and arranged to receive fluid dispensed from the fluid dispenser 200 when the protrusion 144 is secured in the recess 120.

In the example, the fluid transfer system includes a valve 204 connected to the fluid dispenser 200 and configured to regulate fluid flow from the fluid dispenser 200. The valve 204 regulates fluid transfer from the fluid dispenser 200 to the fluid inlet 202 and may be any suitable valve. The valve 204 may be, for example and without limitation, a ball valve, a butterfly valve, a check valve, a gate valve, a globe valve, a needle valve, a pinch valve, or a plug valve. For example, the valve 204 is configured to move from a closed position to an open position when the engagement mechanism 118 engages the connection member 136. The valve 204 is configured to move from the open position to the closed position when the engagement mechanism 118 and the connection member 136 are disengaged. For example, the valve 204 includes an actuator configured to cause movement of the valve 204 when the actuator is contacted by the fluid inlet 202, the first connector 106, the engagement mechanism 118, and/or any other component.

The fluid inlet 202 includes a seal 206 that extends on an inner circumference of the fluid inlet 202 and engages the fluid dispenser 200 to reduce leakage. For example, the seal 206 is an O-ring that is secured within a groove in the inner surface of the bore of the fluid inlet 202. The seal 206 extends around and contacts the outer surface of the fluid dispenser 200 when the fluid dispenser is engaged with the fluid inlet 202.

The fluid inlet 202 also includes a valve or regulation mechanism 208 to control the flow of fluid into the fluid inlet 202 and/or prevent backflow of the fluid out of the fluid inlet 202. The valve 208 may be similar to the valve 204. In embodiments, the fluid transfer system includes any suitable components to regulate fluid flow through the fluid transfer system.

The fluid transfer system facilitates simple and secure attachment of the fluid dispenser 200 and the fluid inlet 202 and facilitates fluid transfer, e.g., liquid and/or gas fuel transfer, between two structures 102, 104.

Example embodiments of docking systems are described above. The systems and methods are not limited to the specific embodiments described herein, but rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A docking system for use with in-space structures, the docking system comprising:

a first connector attached to a first in-space structure, the first connector including a first housing, a sleeve, and an engagement mechanism; and a second connector attached to a second in-space structure, the second connector including a second housing and a connection member including a protrusion extending from the second housing and defining a groove, wherein the second housing is received within the first housing, wherein the sleeve defines a recess sized to receive the connection member, and wherein the engagement mechanism includes at least one inwardly projecting structure that is shaped to be received in the groove to engage the connection member when the connection member is in the recess.

2. The docking system of claim 1, further comprising electrical contacts positioned along the first housing and the second housing and configured to provide an electrical connection between the first in-space structure and the second in-space structure.

3. The docking system of claim 2 further comprising an actuator connected to the electrical contacts on one of the first housing or the second housing and configured to move the electrical contacts into engagement with the electrical contacts on the other of the first housing or the second housing when the second housing is received within the first housing.

4. The docking system of claim 1, further comprising a shear connector pin configured to secure the first housing to the second housing when the second housing is received within the first housing.

5. The docking system of claim 1, further comprising a proximity sensor configured to detect a position of the first connector relative to the second connector.

6. The docking system of claim 1, further comprising a sensor coupled to at least one of the first housing and the second housing and configured to provide a signal related to a force between the first housing and the second housing.

7. The docking system of claim 1, wherein the engagement mechanism comprises a ball that is biased toward and engages the connection member when the connection member is in the recess.

8. The docking system of claim 1, further comprising a fluid dispenser extending through the connection member and a fluid inlet positioned within the sleeve and arranged to receive fluid dispensed from the fluid dispenser when the connection member is secured in the recess.

9. The docking system of claim 8, further comprising a valve connected to the fluid dispenser and configured to regulate fluid flow from the fluid dispenser, wherein the valve is configured to move from a closed position to an open position when the engagement mechanism engages the connection member.

10. The docking system of claim 1, wherein the first and second housing are cones.

11. The docking system of claim 1, further comprising an actuator configured to move the connection member between a first position and a second position, where the connection member is stowed within the second in-space structure in the first position and is arranged to connect with the first connector in the second position.

12. The docking system of claim 1, further comprising an actuator configured to move the first housing between a first position and a second position, wherein the engagement mechanism is configured to engage the connection member when the connection member is positioned in the recess and the first housing is in the second position.

13. The docking system of claim 12, wherein the engagement mechanism is configured to disengage from the connection member when the first housing is in the second position and the connection member is moved relative to the first connector.

14. The docking system of claim 13, further comprising an ejection mechanism including an actuator and a push rod, wherein the push rod is configured to move the connection member relative to the first connector and cause the connection member to be released from the engagement mechanism.

15. A method of connecting in-space structures, the method comprising:

moving a first in-space structure relative to a second in-space structure, the first in-space structure including a first connector including a first housing, a sleeve, and an engagement mechanism, the second in-space structure including a second connector including a second housing and a connection member, the connection member including a protrusion extending from the second housing and defining a groove;

positioning the connection member in a recess defined by the sleeve;

engaging with the engagement mechanism the connection member within the recess defined by the sleeve, wherein the engagement mechanism includes at least one inwardly projecting structure that is shaped to be received in the groove of the connection member when the connection member is engaged with the engagement mechanism; and positioning the second housing within a recess defined by the first housing.

16. The method of claim 15, further comprising connecting first electrical contacts on the first housing with second electrical contacts on the second housing when the first housing is positioned within the recess defined by the second housing.

17. The method of claim 15, further comprising connecting a fluid dispenser extending through one of the first connector or the second connector to a fluid inlet extending through the other of the first connector or the second connector such that the fluid inlet receives fluid dispensed by the fluid dispenser.

18. The method of claim 15, further comprising moving, using an actuator, the connection member between a first position and a second position, where the connection member is stowed within the second in-space structure in the first position and is arranged to connect with the first connector in the second position.

19. The method of claim 15, further comprising moving, using an actuator, the first housing between a first position and a second position, wherein the engagement mechanism is configured to engage the connection member when the connection member is positioned in the recess and the first housing is in the second position.

20. A docking system for use with in-space structures, the docking system comprising:

a first connector attached to a first in-space structure, the first connector including a first housing defining a recess;

a second connector attached to a second in-space structure, the second connector including a second housing that is received within the recess of the first housing, the second connector further including a protrusion extending from the second housing and defining a groove;

an engagement mechanism including at least one inwardly projecting structure that is shaped to be received in the groove of the second connector to secure the second housing in the recess;

a fluid dispenser extending through one of the first connector or the second connector; and a fluid inlet extending through the other of the first connector or the second connector, wherein the fluid inlet is configured to engage with the fluid dispenser and receive fluid dispensed from the fluid dispenser when the second housing is secured in the recess.

* * * * *